(12) United States Patent
Baghel et al.

(10) Patent No.: US 10,999,015 B2
(45) Date of Patent: May 4, 2021

(54) METHODS AND APPARATUS FOR NR D2D URLLC COMMUNICATION

(71) Applicant: QUALCOMM Incorporated, San Diego, CA (US)

(72) Inventors: Sudhir Kumar Baghel, Hillsborough, NJ (US); Junyi Li, Chester, NJ (US); Kapil Gulati, Dover, DE (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/270,286

(22) Filed: Feb. 7, 2019

(65) Prior Publication Data

US 2019/0245656 A1  Aug. 8, 2019

Related U.S. Application Data

(60) Provisional application No. 62/627,932, filed on Feb. 8, 2018.

(51) Int. Cl.
*H04L 1/18* (2006.01)
*H04W 4/46* (2018.01)
(Continued)

(52) U.S. Cl.
CPC .......... *H04L 1/1819* (2013.01); *H04L 1/0003* (2013.01); *H04L 1/08* (2013.01);
(Continued)

(58) Field of Classification Search
CPC ....... H04L 1/1819; H04L 1/0003; H04L 1/08; H04L 1/1864; H04L 1/189; H04W 4/40;
(Continued)

(56) References Cited

U.S. PATENT DOCUMENTS

| 2018/0035331 | A1* | 2/2018 | Sundman | H04L 1/0015 |
| 2020/0022160 | A1* | 1/2020 | Zou | H04W 72/1268 |
| 2020/0044789 | A1* | 2/2020 | Beale | H04W 72/042 |

FOREIGN PATENT DOCUMENTS

WO   2016053844 A1   4/2016

OTHER PUBLICATIONS

Sequans Communications, "Preemption-based multiplexing of URLLC and eMBB in DL," 3rd Generation Partnership Project (3GPP) TSG RAN WG1 Meeting #88, R1-1702117, Athens, Greece, Feb. 13-17, 2017 (Year: 2017).*

(Continued)

*Primary Examiner* — Brian P Cox
(74) *Attorney, Agent, or Firm* — Qualcomm Incorporated

(57) ABSTRACT

Methods and apparatus related to wireless communication, for example, to 5G New Radio (NR) device-to-device (D2D) (e.g., vehicle-to-vehicle (V2V) or vehicle-to-everything (V2X)) ultra-reliable and low-latency communications (URLLC) communication are provided. In aspects, a method of wireless communication by a user equipment (UE) may include transmitting data associated with a URLLC communication in a first set of one or more portions of a wireless communication structure having a plurality of portions, and re-transmitting the data associated with the URLLC communication in a second set of one or more portions of the wireless communication structure, wherein one or more slot structures of the wireless communication structure are defined by the plurality of portions, the first set is based on a first mini-slot structure, the second set is based on a second mini-slot structure, and a mini-slot structure is smaller than a slot structure Numerous other aspects are provided.

30 Claims, 14 Drawing Sheets

(51) Int. Cl.
  *H04W 28/06* (2009.01)
  *H04W 4/40* (2018.01)
  *H04W 72/04* (2009.01)
  *H04W 72/12* (2009.01)
  *H04L 1/00* (2006.01)
  *H04L 1/08* (2006.01)

(52) U.S. Cl.
  CPC ............ *H04L 1/189* (2013.01); *H04L 1/1864* (2013.01); *H04W 4/40* (2018.02); *H04W 28/06* (2013.01); *H04W 72/0446* (2013.01); *H04W 72/121* (2013.01)

(58) Field of Classification Search
  CPC  H04W 28/06; H04W 72/0446; H04W 72/121
  See application file for complete search history.

(56) References Cited

OTHER PUBLICATIONS

Intel Corporation: "Design Aspects Affecting Reliability of URLLC Services", 3GPP Draft; R1-1702243 Intel-URLLC_Reliability, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 13, 2017-Feb. 17, 2017, Feb. 12, 2017 (Feb. 12, 2017), pp. 1-7, XP051209401, Retrieved from the Internet: URL: http://www.3gpp.org/ftp/Meetings_3GPP SYNC/RAN1/Docs/ [retrieved on Feb. 12, 2017].

International Search Report and Written Opinion—PCT/US2019/017308—ISA/EPO—dated May 15, 2019.

Samsung: "TB/CB Handling for eMBB", 3GPP Draft; R1-1700958, 3rd Generation Partnership Project (3gpp), Mobile Competence Centre ; 650, Route Des Lucioles ; F-06921 Sophia-Antipolis Cedex; France, vol. RAN WG1, no. Spokane, USA; Jan. 16, 2017-Jan. 20, 2017 Jan. 16, 2017 (Jan. 16, 2017), XP051208474, 4 pages, Retrieved from the Internet: URL:http://www.3gpp.org/ftp/Meetings_3GPP_SYNC/RAN1/Docs/ [retrieved on Jan. 16, 2017].

Sequans Communications: "Preemption-Based Multiplexing of URLLC and eMBB in DL", 3GPP Draft, R1-1702117, Preemption-Based Multiplexing of URLLC and EMBB in DL, 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017, Feb. 12, 2017 (Feb. 12, 2017), XP051209277, 5 Pages, Retrieved from the Internet: URL: http://www.3gpp.org/ftp/Meetings_3GPP_SYNC/RAN1/Docs/ [retrieved on Feb. 12, 2017].

\* cited by examiner

US 10,999,015 B2

METHODS AND APPARATUS FOR NR D2D URLLC COMMUNICATION

CROSS-REFERENCE TO RELATED APPLICATION

This application claims the benefit of U.S. Provisional Application Ser. No. 62/627,932, entitled "METHODS AND APPARATUS FOR NR D2D URLLC COMMUNICATION" and filed on Feb. 8, 2018, which is expressly incorporated by reference herein in its entirety.

FIELD OF THE DISCLOSURE

This application relates to wireless communication systems, and more particularly to methods and apparatus for 5G New Radio (NR) device-to-device (D2D) (e.g., vehicle-to-vehicle (V2V) or vehicle-to-everything (V2X)) ultra-reliable and low-latency communications (URLLC) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For example, in an aspect of the disclosure, a method of wireless communication by a user equipment (UE), includes transmitting data associated with an ultra-reliable and low-latency communications (URLLC) communication in a first set of one or more portions of a wireless communication structure having a plurality of portions, and re-transmitting the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an additional aspect of the disclosure, a UE for wireless communication includes a memory and at least one processor coupled to the memory, the at least one processor configured to transmit data associated with an ultra-reliable and low-latency communications (URLLC) communication in a first set of one or more portions of a wireless communication structure having a plurality of portions, and to re-transmit the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an additional aspect of the disclosure, a non-transitory computer-readable medium stores one or more instructions for wireless communication by a UE, the one or more instructions, when executed by one or more processors of the UE, causing the one or more processors to transmit data associated with an ultra-reliable and low-latency communications (URLLC) communication in a first set of one or more portions of a wireless communication structure having a plurality of portions, and re-transmit the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an additional aspect of the disclosure, an apparatus for wireless communication includes means for transmitting data associated with an ultra-reliable and low-latency communications (URLLC) communication in a first set of one or more portions of a wireless communication structure having a plurality of portions, and means for re-transmitting the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an aspect of the disclosure, a method of wireless communication by a user equipment (UE), includes receiving data associated with an ultra-reliable and low-latency communications (URLLC) communication in a first set of one or more portions of a wireless communication structure having a plurality of portions, and receiving the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an additional aspect of the disclosure, a UE for wireless communication includes a memory and at least one processor coupled to the memory, the at least one processor configured to receive data associated with an ultra-reliable and low-latency communications (URLLC) communication in a first set of one or more portions of a wireless communication structure having a plurality of portions, and receive the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an additional aspect of the disclosure, a non-transitory computer-readable medium stores one or more instructions for wireless communication by the UE, the one or more instructions, when executed by one or more processors of a user equipment, causing the one or more processors to receive data associated with an ultra-reliable and low-latency communications (URLLC) communication in a first set of one or more portions of a wireless communication structure having a plurality of portions, and to receive the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

In an additional aspect of the disclosure, an apparatus for wireless communication includes means for receiving data associated with an ultra-reliable and low-latency communications (URLLC) communication in a first set of one or more portions of a wireless communication structure having a plurality of portions, and means for receiving the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention may include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments may be implemented in various devices, systems, and methods.

DETAILED DESCRIPTION

Figure 1:
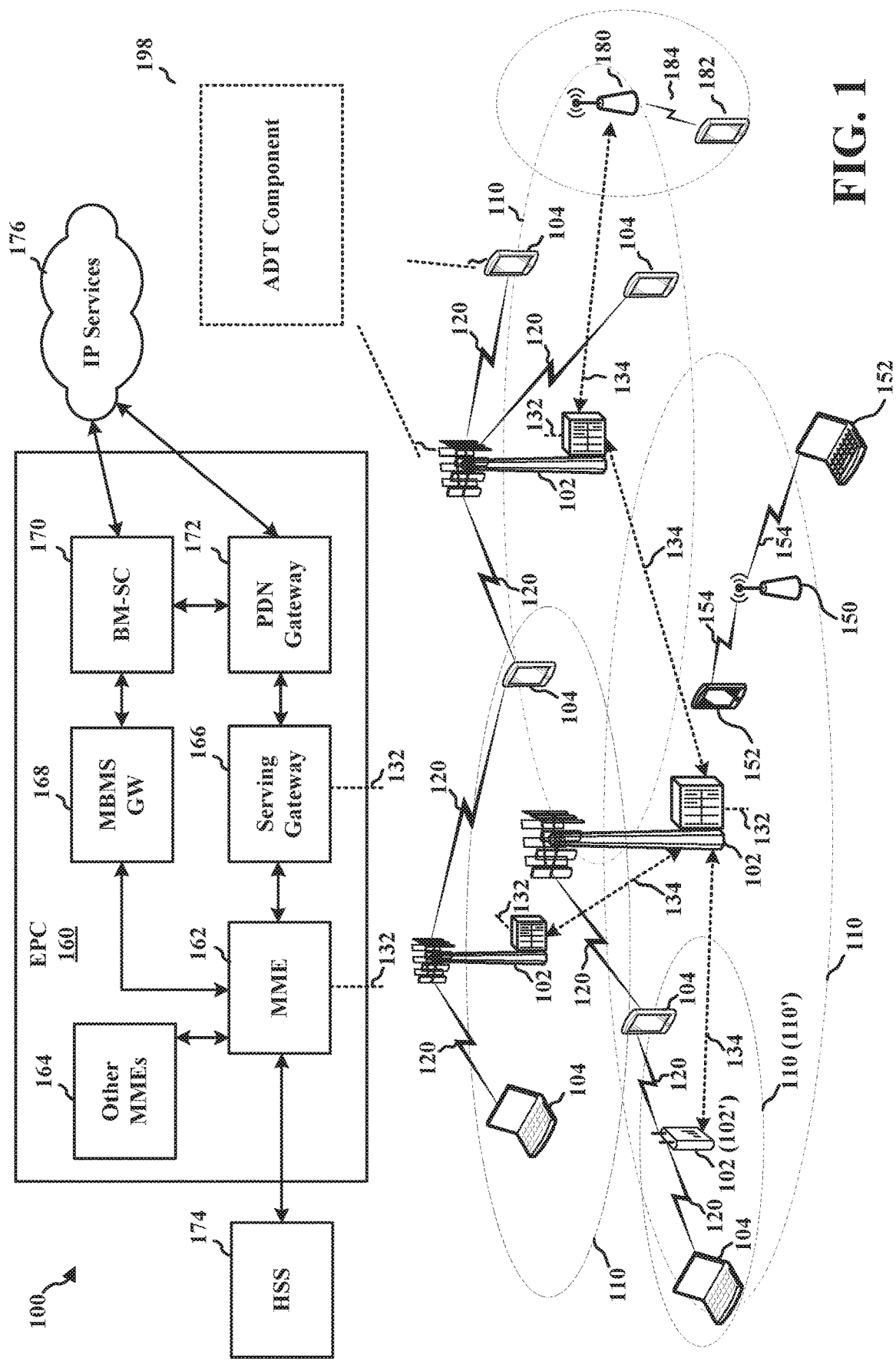
FIG. 1 is a diagram illustrating an example of a wireless communication system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communication system and an access network 100 in accordance with various aspects of the present disclosure. The wireless communication system (also referred to as a wireless wide area network (WWAN)) includes base stations 102, UEs 104, and an Evolved Packet Core (EPC) network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100 MHz) bandwidth, for example, per carrier allocated in a carrier aggregation of up to a total of Yx MHz (x component carriers), used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In aspects, the wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A gNodeB (gNB) 180, for example, may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 184 with the UE 104 to compensate for the extremely high path loss and short range.

The EPC network 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MB SFN) area broadcasting a particular service, and may be responsible for session management (start/stop) and for collecting eMBMS related charging information.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

In aspects, NR UEs may be considered Enhanced Mobile Broadband (eMBB) UEs employing service targeting wide bandwidth (e.g., 80 megahertz (MHz) and beyond). In aspects, such service may include, for example, voice, messaging and/or video streaming services similar to LTE communication. Additionally, or alternatively, NR UEs may be considered millimeter wave (mmW) UEs targeting high carrier frequency (e.g., 60 gigahertz (GHz)) communication. Additionally, or alternatively, NR UEs may be considered ultra reliable and low latency communications (URLLC) UEs using mission critical URLLC service. In aspects, such service may include, for example, factory automation, robotics, remote surgery, and/or autonomous driving. Additionally, or alternatively, NR UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices. Additionally, or alternatively, NR UEs may be considered massive MTC (mMTC) UEs targeting non-backward compatible MTC techniques.

It is noted that while aspects may be described herein using terminology commonly associated with 3G and/or 4G wireless technologies, aspects of the present disclosure may be applied in other generation-based communication systems, such as 5G and later, including NR technologies.

In some aspects, the present disclosure is directed to supporting URLLC services (e.g., over TDD). URLLC services may include transmission and reception of URLLC data. Such transmissions and receptions may often have low latency and high reliability requirements. Unfortunately, the nominal structure of an enhanced mobile broadband (eMBB) TDD subframe has several fundamental limitations that restrict the reliability and latency achievements that may be obtained. For example, although a nominal TDD subframe may be self-contained, in that it may contain a downlink (DL) interval and an uplink (UL) interval, in the nominal TDD subframe structure only one direction in downlink or uplink may be active at any time. This feature creates a self-blocking characteristic in the nominal TDD subframe structure. Thus, during uplink intervals, no downlink transmissions are possible. Similarly, during downlink intervals, no uplink transmissions are possible.

In aspects, URLLC services may be associated with a requirement of $10^{-5}$ error probability (e.g., in transmitting a layer 2 PDU of 32 bytes within 1 ms). For communication availability and resilience, and user plane latency of delivery (e.g., of a packet of size 300 bytes), requirements for D2D communication, like enhanced V2X communication, may be as follows (1) Reliability=$10^{-5}$, and user plane latency=3-10 msec, for direct communication via sidelink and communication range of (e.g., a few meters); and (2) Reliability=$10^{-5}$, and user plane latency=3-10 msec, when the packet is relayed via BS.

Thus, a deadline constraint for the communication of URLLC data may exist. For example, a delay budget consisting of a particular period of time or number of symbols may be provided. Given the deadline constraint, URLLC data may be successfully delivered within the delay budget. Because of the self-blocking limitation of the nominal TDD subframe structure, a large nominal TDD subframe structure limits the number of possible URLLC data transmissions within the given delay budget and thus, the highest system reliability that may be achieved. As described below, the present disclosure provides a solution to these, and other problems, by providing a URLLC frame configuration (e.g., subframe configuration) that takes into account the limitations of the nominal TDD subframe.

Referring again to FIG. 1, in certain aspects, the UE 104 may be configured to perform a communication with a second UE 104' for a device-to-device (D2D) communication. In aspects, such communication by the UE 104 may be a sidelink communication (e.g., using a carrier 192 like a sidelink carrier) with a second UE 104' for a device-to-device (D2D) communication. In aspects, the D2D communication may include a vehicle-to-everything (V2X) communication or a vehicle-to-vehicle (V2V) communication. The UE 104 may communicate with a second UE 104' via the carrier 192 using one or more sidelink communication structures having at least one feedback symbol. In an aspect, at least a portion of a plurality of frequency bands for the carrier 192 corresponds to an Intelligent Transport System frequency spectrum for a sidelink carrier. In aspects, the D2D communication may include NR D2D URLLC communication as described herein.

Figure 2A:
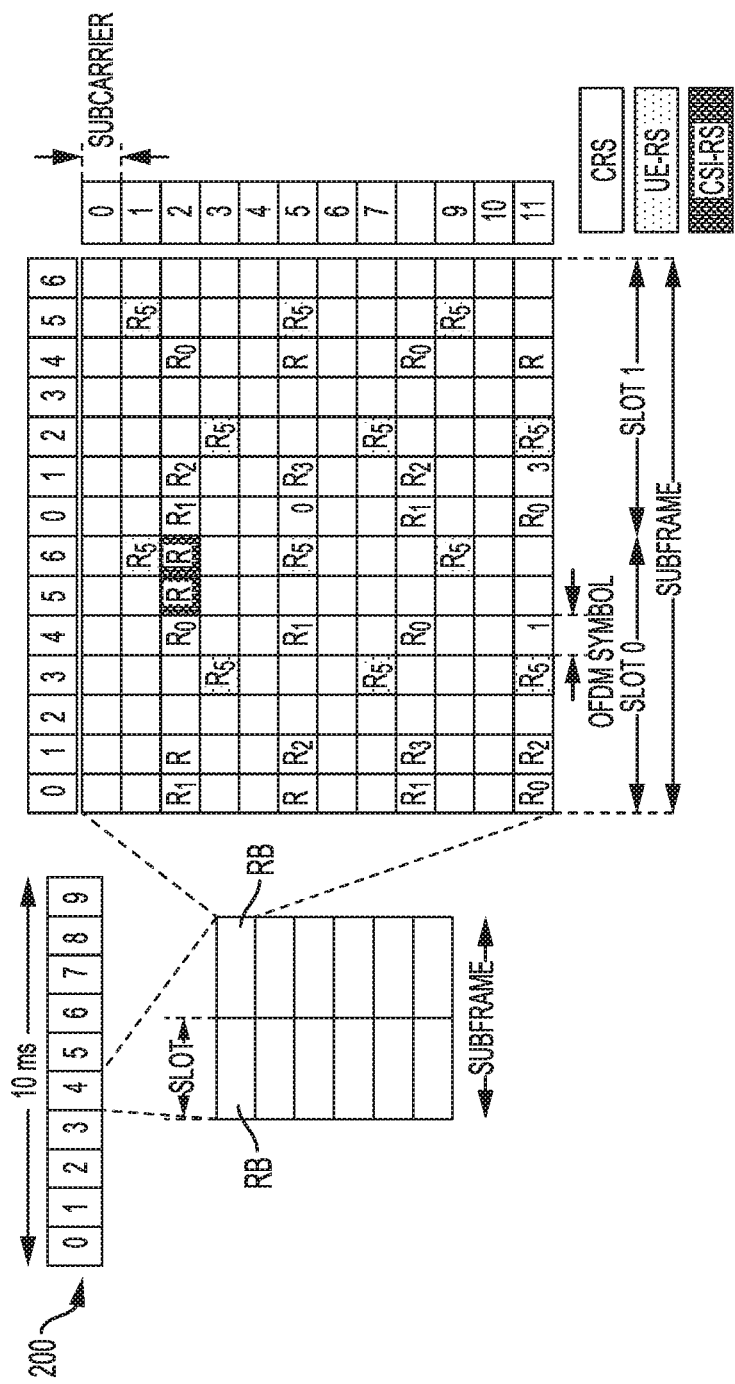
FIGS. 2A, 2B, 2C, and 2D are diagrams illustrating examples of a DL frame structure, DL channels within the DL frame structure, an UL frame structure, and UL channels within the UL frame structure, respectively, in accordance with various aspects of the present disclosure.
Figure 2B:
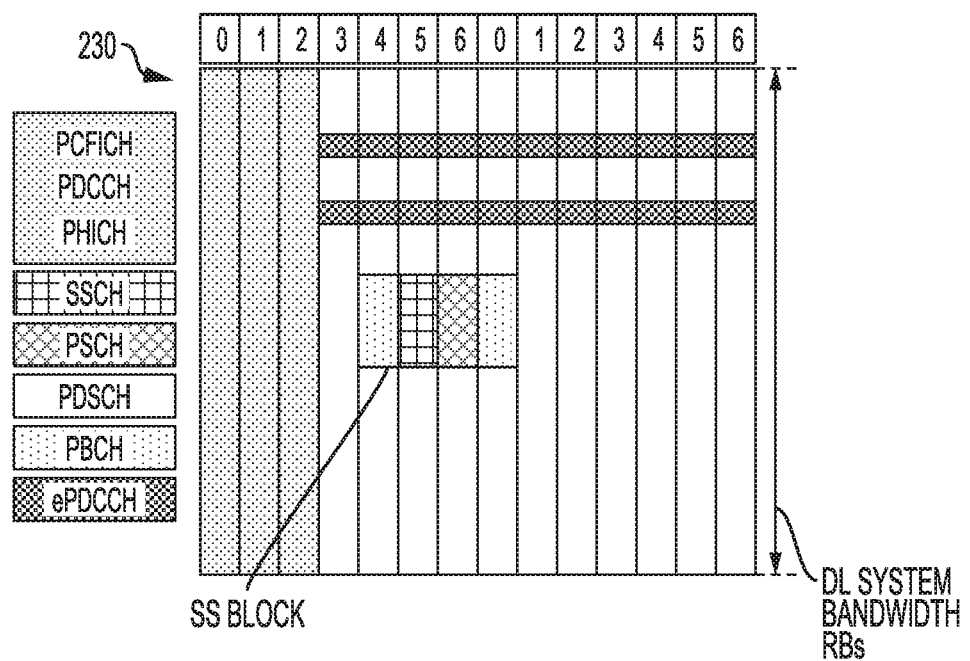
Figure 2C:
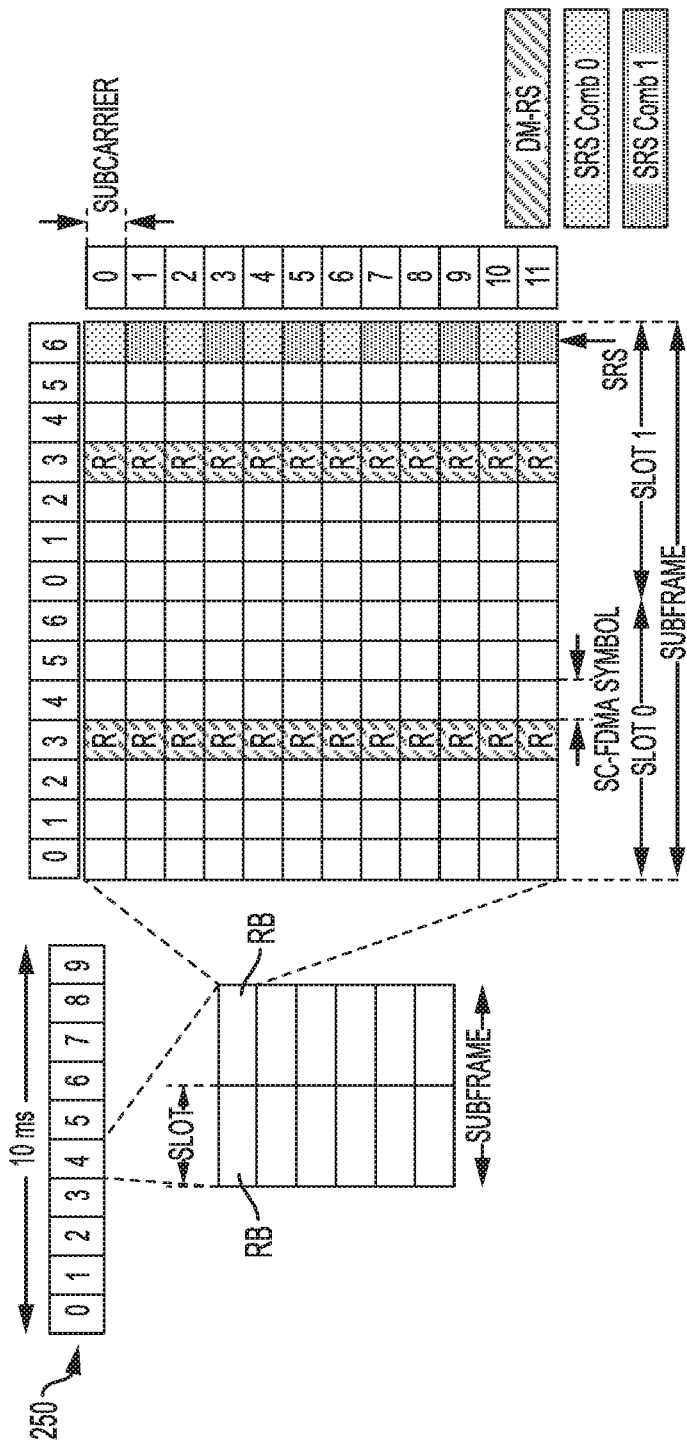
Figure 2D:
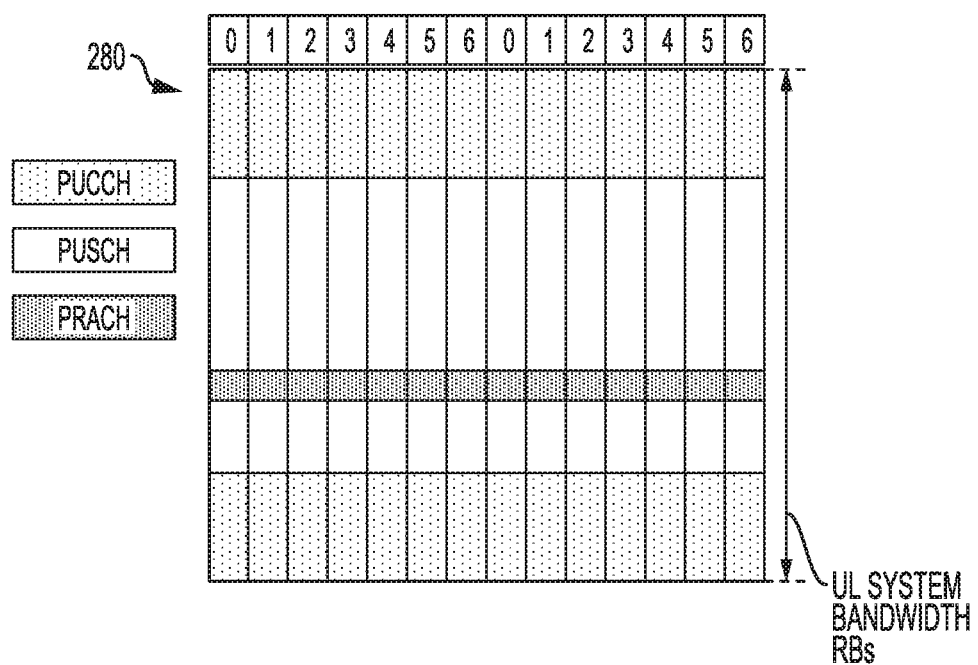

FIG. 2A is a diagram 200 illustrating an example frame structure of one or more downlink (DL) frames in accordance with various aspects of the present disclosure. FIG. 2B is a diagram 230 illustrating an example of channels within the frame structure of a DL frame in accordance with various aspects of the present disclosure. FIG. 2C is a diagram 250 illustrating an example frame structure of one or more uplink (UL) frames in accordance with various aspects of the present disclosure. FIG. 2D is a diagram 280 illustrating an example of channels within the frame structure of a UL frame in accordance with various aspects of the present disclosure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers (e.g., for 15 kHz subcarrier spacing) in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (e.g., also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
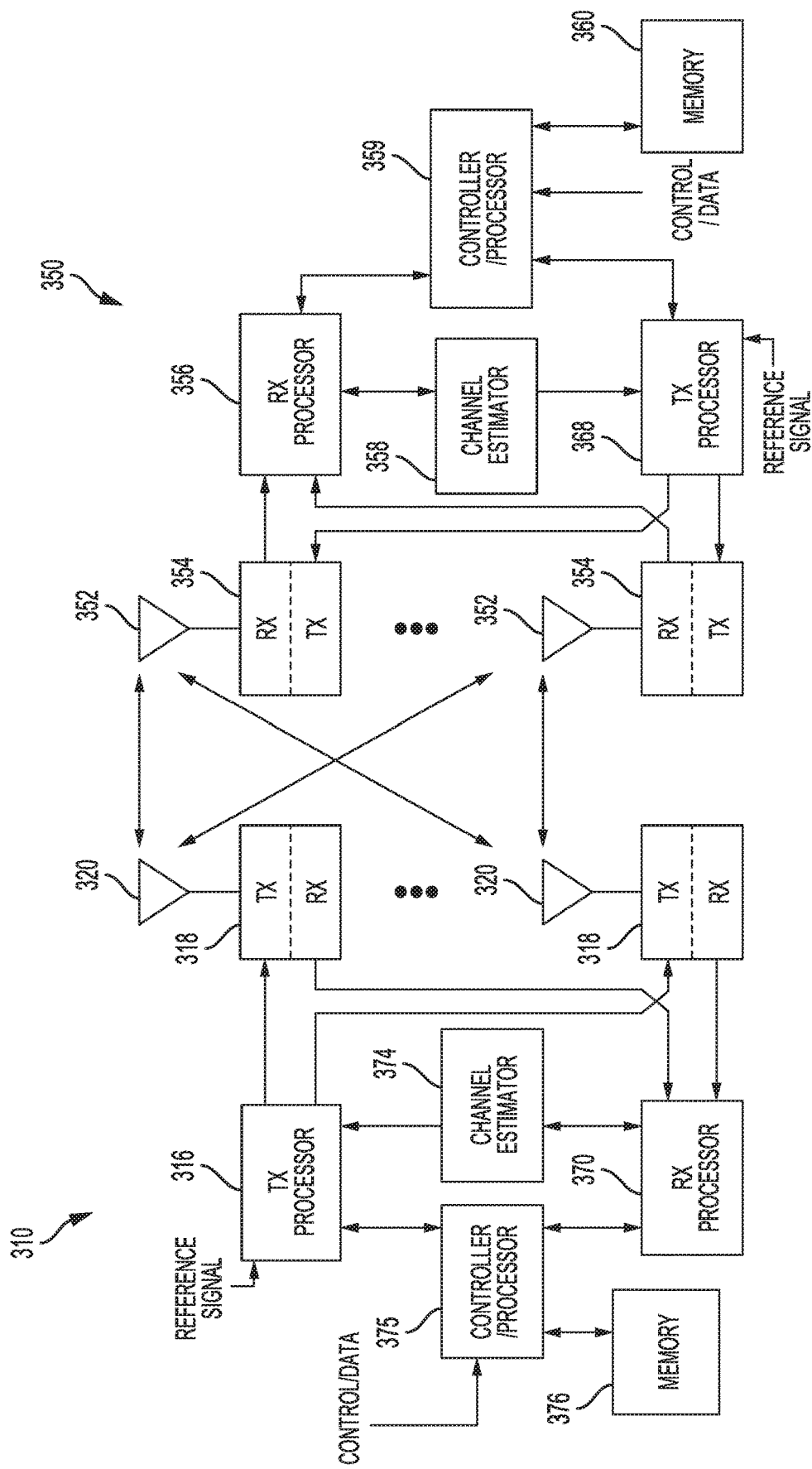
FIG. 3 is a diagram illustrating an example of a base station and user equipment (UE) in an access network in accordance with various aspects of the present disclosure.

FIG. 3 is a block diagram of a base station 310 in communication with a UE 350 in an access network in accordance with various aspects of the present disclosure. In the DL, IP packets from the EPC network 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 may be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 may be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

One or more components of UE 350 may be configured to perform methods of NR D2D URLLC communication, as described in more detail elsewhere herein. For example, the controller/processor 359 and/or other processors and modules of UE 350 may perform or direct operations of, for example, process 800 of FIG. 8, process 900 of FIG. 9, and/or other processes as described herein. In some aspects, one or more of the components shown in FIG. 3 may be employed to perform example process 800 of FIG. 8, process 900 of FIG. 9, and/or other processes as described herein.

In some aspects, UE 350 may include means for transmitting data associated with an ultra-reliable and low-latency communications (URLLC) communication in a first set of one or more portions of a wireless communication structure having a plurality of portions, and means for re-transmitting the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure. In some aspects, UE 350 may include means for receiving data associated with an ultra-reliable and low-latency communications (URLLC) communication in a first set of one or more portions of a wireless communication structure having a plurality of portions, and means for receiving the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure. In some aspects, such means may include one or more components of UE 350 described in connection with FIG. 3.

Figure 4:
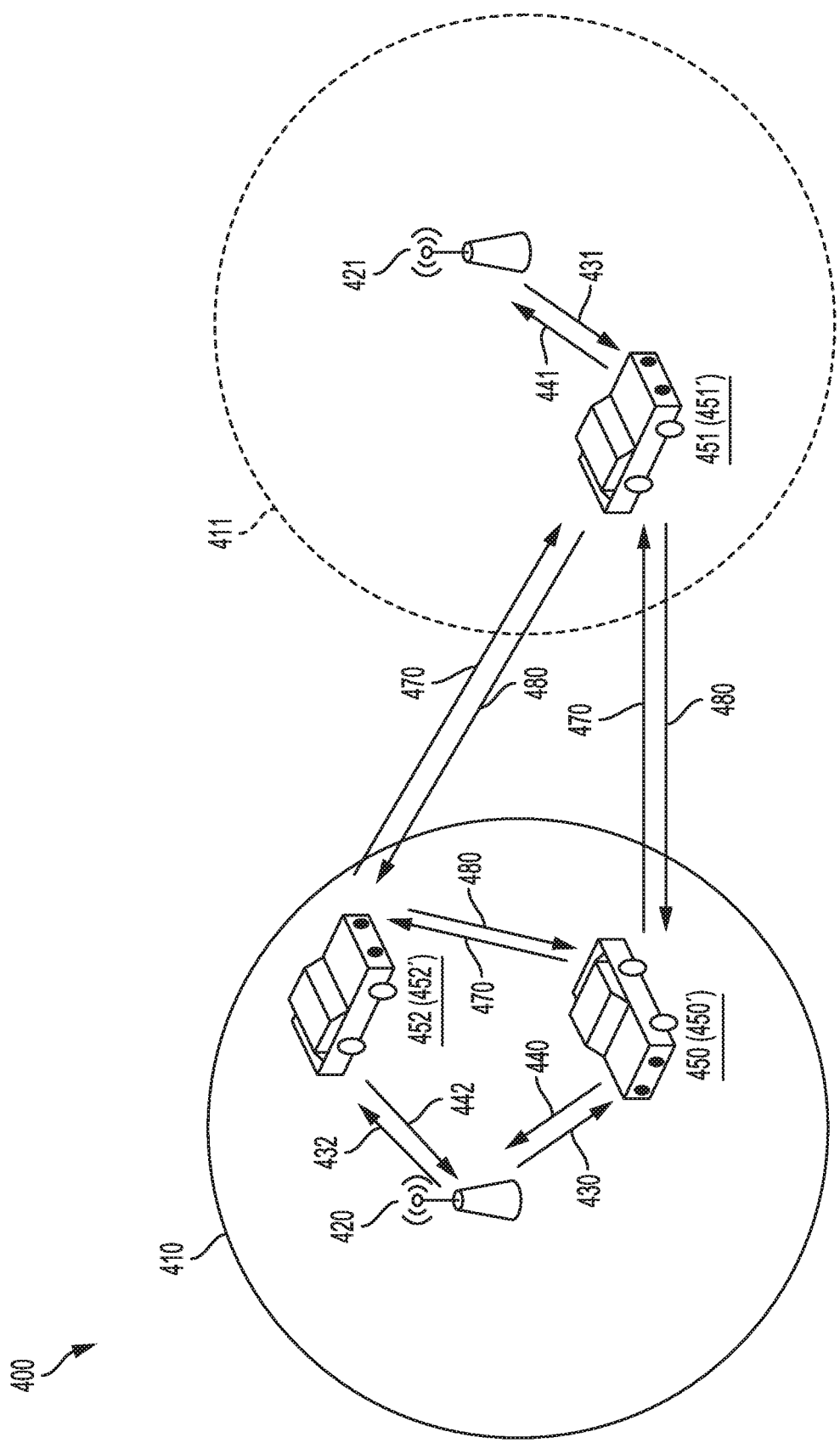
FIG. 4 is a diagram of a wireless communication system in accordance with various aspects of the present disclosure.

FIG. 4 is a diagram of a device-to-device (D2D) communication system 400 which, for example, may include vehicle-to-everything (V2X) communication system and/or vehicle-to-vehicle (V2V) communication system in accordance with various aspects of the present disclosure. For example, the D2D communication system 400 may include a first vehicle 450' that communicates with a second vehicle 451'. In some aspects, the first vehicle 450' and/or the second vehicle 451' may be configured to communicate in a specific spectrum, such as an intelligent transport systems (ITS) spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive.

The D2D communication system 400 may utilize LTE technology or another technology (e.g., 5G NR). For example, a vehicle in D2D communication may incorporate therein a UE of the LTE or 5G NR technology. In D2D communication (e.g., V2X communication or V2V communication), the vehicles 450', 451' may be on networks of different mobile network operators (MNOs). Each of the networks may operate in its own frequency spectrum. For example, the air interface to a first vehicle 450' (e.g., the Uu interface) may be on one or more frequency bands different from the air interface of the second vehicle 451'. The first vehicle 450' and the second vehicle 451' may communicate via a sidelink (e.g., using a carrier 192 like a sidelink carrier), for example, via the PC5 interface. In some examples, the MNOs may schedule sidelink communication between or among the vehicles 450', 451' in V2X spectrum (e.g., V2V spectrum). An example of the V2X spectrum may include the intelligent transport system (ITS) frequency spectrum. The ITS spectrum may be unlicensed, and therefore a plurality of different technologies may use the ITS spectrum for communication, including LTE, LTE-Advanced, Licensed Assisted Access (LAA), Dedicated Short Range Communications (DSRC), 5G, new radio (NR), 4G, and the like. The foregoing list of technologies is to be regarded as illustrative, and is not meant to be exhaustive. However, in some aspects, a D2D communication (e.g., a sidelink communication) between or among vehicles 450', 451' is not scheduled by MNOs.

The D2D communication system 400 may be present where devices (e.g., vehicles) operate in networks of different MNOs and/or different frequency spectrums. For example, each of the vehicles in a D2D (e.g., V2V or V2X) communication system may have a subscription from a respective corresponding MNO. The V2X spectrum may be shared with the frequency spectrums of the MNOs. In some examples, the D2D (e.g., V2V or V2X) communication system 400 may be deployed where the first vehicle 450' operates in the network operated by a first MNO, and the second vehicle 451' is not in a network—e.g., the V2X spectrum may have no network deployed.

The first vehicle 450' may be in D2D (e.g., V2V or V2X) communication with the second vehicle 451'. The first vehicle 450' incorporates the first UE 450, and the second vehicle 451' incorporates the second UE 451. The first UE 450 may operate on a first network 410 (e.g., of the first MNO). In aspects, the D2D communication system 400 may further include a third vehicle 452' that incorporates a third UE 452. The third UE 452 may operate on the first network 410 (e.g., of the first MNO) or another network, for example. The third vehicle 452' may be in D2D (e.g., V2V or V2X) communication with the first vehicle 450' and/or second vehicle 451'.

The first network 410 operates in a first frequency spectrum and includes the first base station 420 communicating at least with the first UE 450, for example, as described in FIGS. 1-3. The first base station 420 may communicate with the first UE 450 via a DL carrier 430 and/or an UL carrier 440. The DL communication may be performed via the DL carrier 430 using various DL resources (e.g., the DL subframes (FIG. 2A) and/or the DL channels (FIG. 2B)). The UL communication may be performed via the UL carrier 440 using various UL resources (e.g., the UL subframes (FIG. 2C) and the UL channels (FIG. 2D)).

In some aspects, the second UE 451 may not be on a network. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 communicating with the second UE 451, for example, as described in FIGS. 1-3.

The second base station 421 may communicate with the second UE 451 via a DL carrier 431 and an UL carrier 441. The DL communication is performed via the DL carrier 431 using various DL resources (e.g., the DL subframes (FIG. 2A) and/or the DL channels (FIG. 2B)). The UL communication is performed via the UL carrier 441 using various UL resources (e.g., the UL subframes (FIG. 2C) and/or the UL channels (FIG. 2D)).

The D2D (e.g., V2V or V2X) communication may be carried out via one or more carriers (e.g., sidelink carriers) 470, 480. The one or more carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the carriers 470, 480 may operate using the PC5 interface. The first UE 450 (e.g., incorporated in the first vehicle 450') may transmit to one or more (e.g., multiple) devices, including to the second UE 451 (e.g., incorporated in the second vehicle 451') via the first carrier 470. The second UE 451 may transmit to one or more (e.g., multiple) devices, including to the first UE 450 (e.g., incorporated in the vehicle 450') via the second carrier 480.

In some aspects, the UL carrier 440 and the first carrier 470 may be aggregated to increase bandwidth. In some aspects, the first carrier 470 and/or the second carrier 480 may share the first frequency spectrum (with the first network 410) and/or share the second frequency spectrum (with the second network 411). In some aspects, the first and second carriers 470, 480 may operate in an unlicensed spectrum.

Various use cases exist for D2D communication. For intelligent transport systems and/or infrastructure backhaul, an exemplary communication (e.g., traffic light information) flow may include traffic control center (TCC)→Roadside Unit (RSU)→vehicle). An additional or alternative exemplary communication (e.g., collection of vehicle probe data) flow may include vehicle→RSU→TCC. For reliable distribution of data, low-latency and/or high-capacity connections between RSUs (e.g. traffic lights, traffic signs, etc.) and the TCC is required. Similarly, low-latency and communication is required between RSU and Vehicles. For example, tight end-to-end latency of a few ms with reliability of the communication service of 99.9999% may be required to compete with existing wired technology and/or to justify the costly deployment and maintenance of RSUs. An additional or alternative use case may include message exchanges for co-operative driving with intention sharing where vehicles dynamically change decisions to change their path and direction.

An additional or alternative use case for D2D communication may include sensor and/or trajectory information sharing which may have an arbitrary traffic pattern. For example, sensor information for a number of detected objects on the road and/or a field of view information associated with a vehicle may be transmitted.

The exemplary methods and apparatuses discussed infra are applicable to any of a variety of wireless D2D (e.g., V2V or V2X) communication systems. To simplify the discussion, the exemplary methods and apparatus may be discussed within the context of LTE and/or NR. However, one of ordinary skill in the art would understand that the exemplary methods and apparatuses are applicable more generally to a variety of other wireless D2D (e.g., V2V or V2X) communication systems.

In aspects, a D2D communication on the one or more carriers 470, 480 may occur between the first UE 450 (e.g., incorporated in the first vehicle 450') and the second UE 451 (e.g., incorporated in the second vehicle 451'). In an aspect, the first UE 450 (e.g., incorporated in the first vehicle 450') may perform a D2D communication with one or more (e.g., multiple) devices, including to the second UE 451 (e.g., incorporated in the second vehicle 451') via the first carrier 470. For example, the first UE 450 may transmit a broadcast transmission via the first carrier 470 to the multiple devices (e.g., the second and third UEs 451, 452). The second UE 451 (e.g., among other UEs) may receive such broadcast transmission. Additionally, or alternatively, the first UE 450 may transmit a multicast transmission via the first carrier 470 to the multiple devices. The second UE 451 (e.g., among other UEs) may receive such multicast transmission. Further, additionally or alternatively, the first UE 450 may transmit a unicast transmission via the first carrier 470 to a device, such as the second UE 451. The second UE 451 (e.g., among other UEs) may receive such unicast transmission. Additionally, or alternatively, in an aspect, the second UE 451 (e.g., incorporated in the second vehicle 451') may perform a D2D communication with one or more (e.g., multiple) devices, including the first UE 450 (e.g., incorporated in the first vehicle 450') via the second carrier 480. For example, the second UE 451 may transmit a broadcast transmission via the second carrier 480 to the multiple devices. The first UE 450 (e.g., among other UEs) may receive such broadcast transmission. Additionally, or alternatively, the second UE 451 may transmit a multicast transmission via the second carrier 480 to the multiple devices (e.g., the first and third UEs 450, 452). The first UE 450 (e.g., among other UEs) may receive such multicast transmission. Further, additionally or alternatively, the second UE 451 may transmit a unicast transmission via the second carrier 480 to a device, such as the first UE 450. The first UE 450 (e.g., among other UEs) may receive such unicast transmission. The third UE 452 may communicate in a similar manner.

In aspects, for example, such a D2D communication on the one or more carriers between the first UE 450 and the second UE 451 may occur without having MNOs allocating resources (e.g., one or more portions of a resource block (RB), slot, frequency band and/or channel associated with the one or more carriers 470, 480) for such communication and/or without scheduling such communication. In aspects, a D2D communication may include a traffic communication (e.g., a data communication, control communication, a paging communication and/or a system information communication). Further, in aspects, a D2D communication may include a feedback communication via the one or more carriers 470, 480 associated with a traffic communication (e.g., a transmission of feedback information for a previously-received traffic communication). A feedback portion of the D2D communication structure may allot for any D2D communication feedback information that may be communicated in the device-to-device (D2D) communication system 400 between devices (e.g., a first vehicle 450' and a second vehicle 451'). In aspects, a D2D communication may be associated with one or more transmission time intervals (TTIs). In aspects, a TTI may be 0.5 ms. Although a larger or smaller value may be employed. In aspects, a D2D communication may employ at least one first wireless communication structure having a plurality of portions, wherein one or more slot structures of the first wireless communication structure are defined by the plurality of portions. In aspects, such D2D communication may be associated with and/or correspond with a slot structure. In aspects, a TTI may be associated with and/or correspond to a communication structure slot.

While such first wireless communication structure having one or more slot structures may be useful for normal NR D2D communication, another wireless communication structure that provides increased reliability and/or reduced latency may be useful for UEs employing mission critical URLLC service, like NR D2D URLLC communication. For example, a wireless communication structure that provides a finer granularity of frequency and/or time resource utilization than the wireless communication structure used for normal NR D2D communication may be useful. Thus, in aspects, a D2D communication may employ at least one second wireless communication structure having a plurality of portions (e.g., symbols), wherein one or more slot structures of the second wireless communication structure are defined by the plurality of portions, a first set of one or more portions of the plurality of portions is based on a first mini-slot structure, and a second set of one or more portions of the plurality of portions is based is based on a second mini-slot structure, wherein a mini-slot structure is smaller than a slot structure. In aspects, such D2D communication may be associated with and/or correspond with a mini-slot structure. In aspects, the D2D communication may be associated with one or more portions of one or more transmission time intervals (TTIs). In aspects, a TTI may be 0.5 ms. Although a larger or smaller value may be employed. In aspects, a TTI may be associated with and/or correspond to a communication structure slot.

Figure 5:
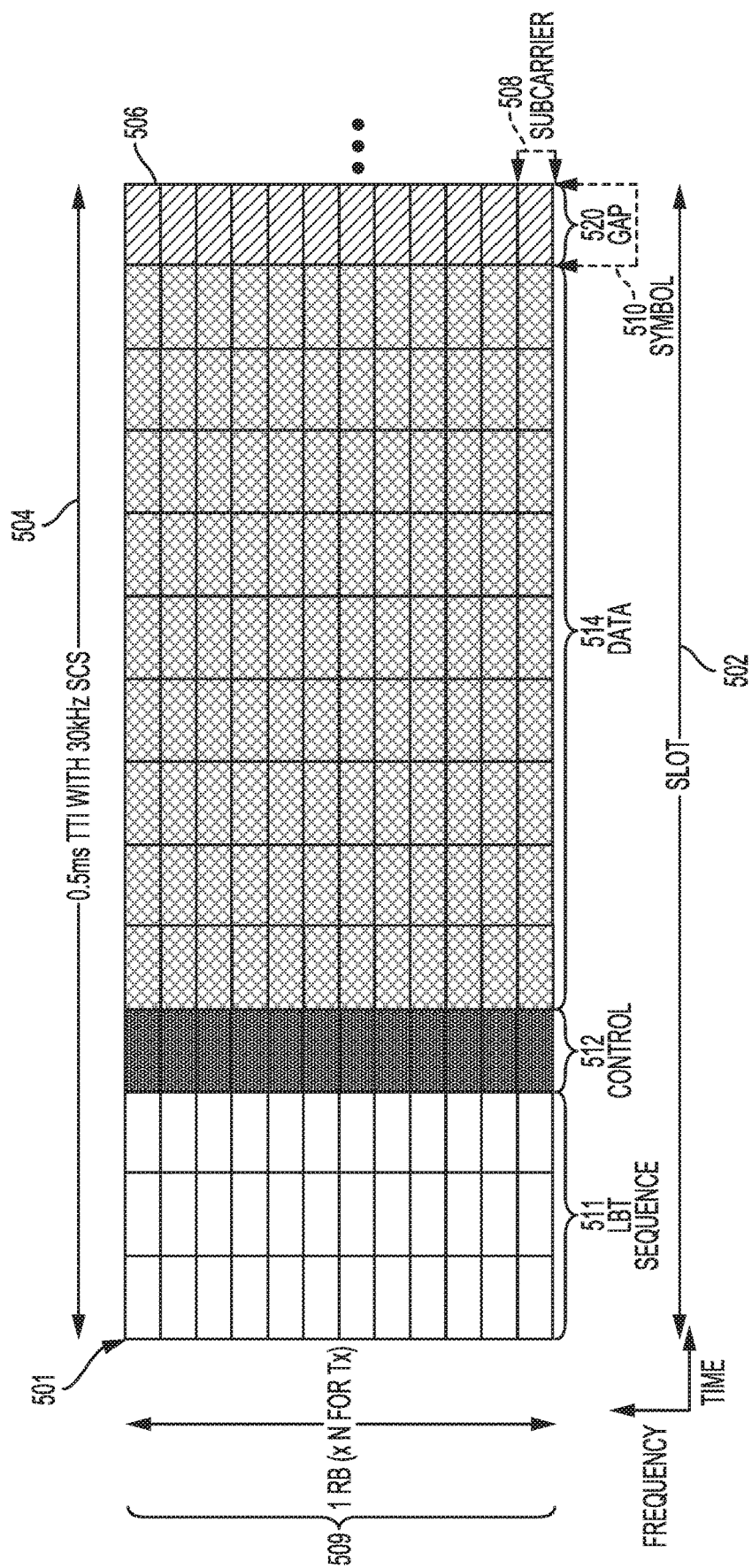
FIG. 5 is a diagram illustrating an example 5G New Radio (NR) device-to-device (D2D) communication structure in accordance with various aspects of the present disclosure.

FIG. 5 is a diagram illustrating an example first wireless communication structure 501 (e.g., a first 5G NR D2D communication structure) in accordance with various aspects of the present disclosure. The first wireless communication structure 500 may be defined by resources in a frequency domain and time domain. For example, the first wireless communication structure 501 may represent a time slot 502 and/or correspond to a TTI 504 (e.g., 0.5 ms). A resource grid may be used to represent the time slot 502 including one or more time concurrent resource blocks (RBs) (also referred to as physical RBs (PRBs)). The resource grid is divided into multiple resource elements (REs). In aspects, an RB 506 includes 12 consecutive subcarriers (e.g., having 30 kHz subcarrier spacing) 508 in the frequency domain and 14 consecutive symbols 510 in the time domain, for a total of 168 REs. In aspects, an RB contains 12 consecutive subcarriers in the frequency domain and 12 consecutive symbols in the time domain, for a total of 144 REs. In aspects, a device (e.g., the first vehicle 450' or UE 450) may employ a plurality of resources blocks (e.g., N RBs) for a NR D2D communication (e.g., a sidelink transmission) 509 in the D2D communication system 400. The NR D2D communication 509 may correspond to a single TTI.

In aspects, one or more symbols 510 (e.g., one or more of the first three symbols 511) of the wireless communication structure 500 may be employed to communicate a listen-before-talk (LBT) sequence in a NR D2D communication. Transmission of the NR D2D communication by a device may be based on the LBT sequence. In aspects, one or more symbols (e.g., the fourth symbol 512) of the wireless communication structure 500 may be employed to communicate control information in a NR D2D communication (e.g., by the device). In aspects, one or more symbols 510 (e.g., the fifth through thirteenth symbols 514) of the wireless communication structure 501 may be employed to communicate data of a NR D2D communication (e.g., by the device). In aspects, one or more symbols 510 (e.g., the fourteenth symbol 520) of the wireless communication structure 500 may be as a guard period to accommodate uplink-downlink switching (e.g., turnaround) time and/or the feedback portion (e.g., in which the device may receive feedback information).

In aspects, for example, the NR D2D communication structure 500 may be employed for a unicast NR D2D communication. In aspects, for example, the NR D2D communication structure 501 may be employed for a broadcast NR D2D communication. For example, the NR D2D communication structure 501 may be employed for a broadcast NR D2D transmission from a device (e.g., the first vehicle 450') in the D2D communication system 400 to a plurality of other devices (e.g., including the second vehicle 451') device in the D2D communication system 400. In aspects, for example, the NR D2D communication structure 501 may be employed for a multicast NR D2D communication. For example, the NR D2D communication structure 501 may be employed for a multicast NR D2D transmission from a device (e.g., the first vehicle 450') in the D2D communication system 400 to a plurality of other devices (e.g., including the second vehicle 451') device in the D2D communication system 400. The NR D2D communication structure 501 described above is exemplary and may be defined differently in the time and/or frequency domain. Additionally, or alternatively, the NR D2D communication structure 501 may be differently associated with a TTI (e.g., correspond to one or more portions of a TTI). While the NR D2D communication structure 501 may provide suitable and/or acceptable reliability and/or latency for normal NR D2D communication, such reliability and/or latency may not be suitable and/or acceptable for mission critical URLLC service, like NR D2D URLLC communication. For example, since a NR D2D URLLC communication may be associated with less data traffic bits than a NR D2D normal communication, employing a NR D2D communication structure 501 having such control, data, and/or gap overhead for NR D2D URLLC communication may be inefficient.

In aspects, the present methods and apparatus provide for NR D2D URLLC communication. NR D2D normal communication and NR D2D URLLC communication may co-exist (e.g., for better resource utilization), such that a same time/frequency resource may be used for either NR D2D normal communication or NR D2D URLLC communication, as needed. Although, in some aspects, separate time/frequency resources may be used for NR D2D normal communication and NR D2D URLLC communication. In aspects, NR D2D URLLC communication may be employed in a coverage area and/or out of a coverage area (e.g., via URLLC sidelink communication). A NR D2D communication may be autonomously performed by a UE 104, 104', 350, 450, 451, 452 or scheduled by a base station 102.

For NR D2D normal communication and NR D2D URLLC communication to co-exist, overlapping slot(s) and mini-slot(s) may be employed. All resources or subset of resources may be shared between normal traffic and URLLC traffic. Such arrangement of resources may be pre-configured or determined based on some other mechanism. In this manner, a better granularity for URLCC resources may be employed.

In aspects, a NR D2D URLLC transmission of data may be less than the normal TTI for NR D2D normal transmission of data (e.g., 0.5 ms). Using 7 symbols of 35 μs each for a mini-slot, for example, results in approximately a 0.25 ms mini-slot (e.g., for NR D2D URLLC). In aspects, a 1 OFDM symbol mini-slot for URLLC may be supported, for example, based on random selection of URLLC resources (e.g., of a 7 OFDM symbol mini-slot) and sensing of unused resources. In aspects, NR D2D URLLC communication may be associated with small packets (e.g., ~32 bytes) similar to Uu interface URLLC communication. In aspects, NR D2D URLLC communication may be multicast, broadcast, and/or unicast communication. In aspects, a slot boundary and/or mini-slot boundary may be aligned with a symbol boundary. In aspects, a mini-slot boundary may be aligned with a slot boundary. For example, suitable numerologies may be employed for such alignment. In aspects, a UE 104, 104', 350, 450, 451, 452 wanting to communicate a NR D2D URLLC communication may employ an LBT symbol to indicate reservation to another UE 104, 104', 350, 450, 451, 452 wanting to communicate a NR D2D normal communication.

Figure 6:
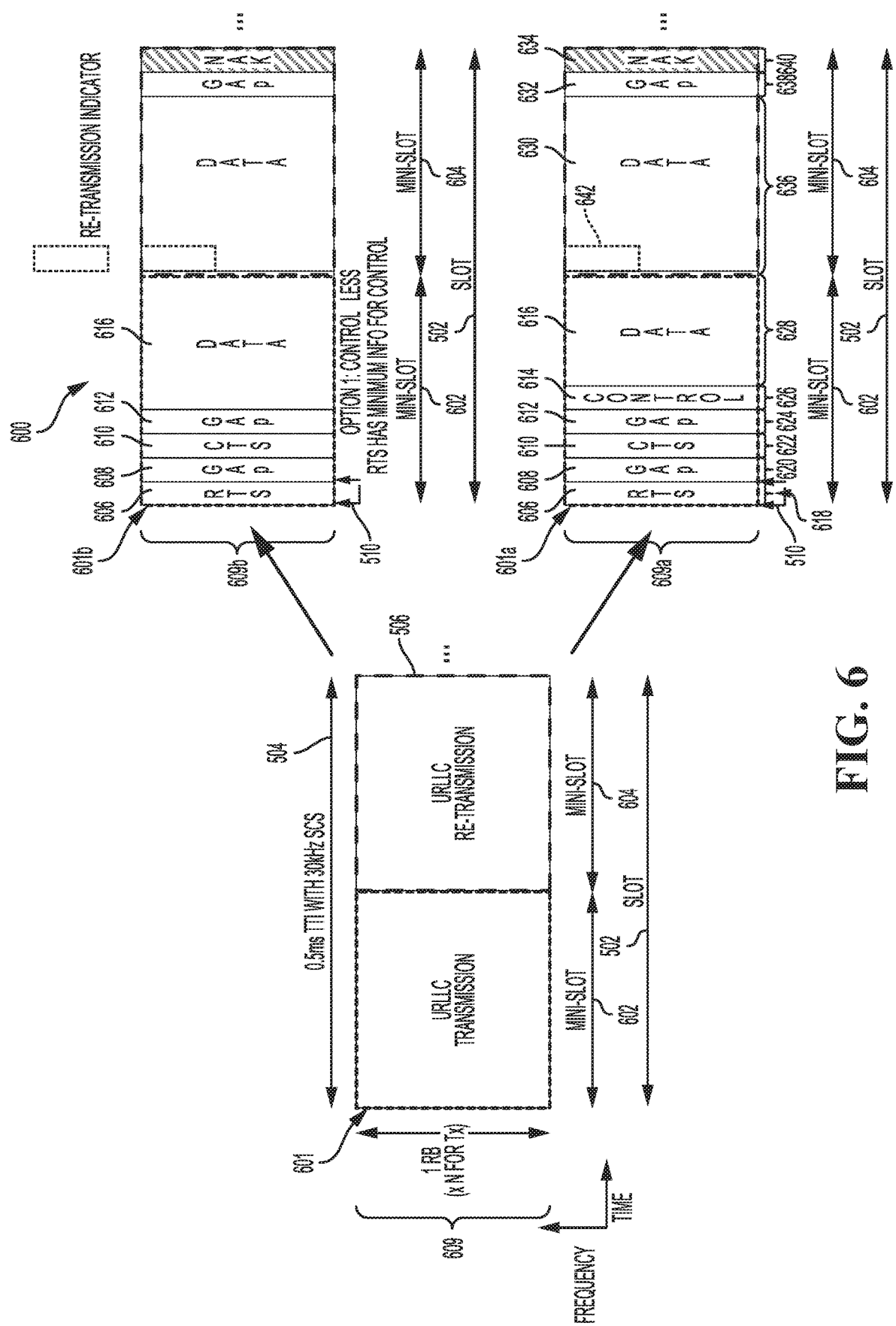
FIG. 6 is a diagram illustrating NR D2D (e.g., vehicle-to-vehicle (V2V) or vehicle-to-everything (V2X)) ultra-reliable and low-latency communications (URLLC) communication in accordance with various aspects of the present disclosure.

FIG. 6 is a diagram illustrating NR D2D (e.g., V2V or V2X) ultra-reliable and low-latency communications (URLLC) communication 600 in accordance with various aspects of the present disclosure. For example, a wireless communication structure 601 (e.g., a NR D2D URLLC wireless communication structure) may be employed for the NR D2D URLLC communication in accordance with various aspects of the present disclosure. The wireless communication structure 601 may be defined by resources in a frequency domain and time domain. In aspects, the wireless communication structure 601 may have a plurality of portions (e.g., symbols), wherein one or more slot structures 502 of the second wireless communication structure are defined by the plurality of portions, a first set of one or more portions of the plurality of portions is based on a first mini-slot structure 602, and a second set of one or more portions of the plurality of portions is based is based on a second mini-slot structure 604, wherein a mini-slot structure is smaller than a slot structure. For example, similar to the wireless communication structure 501, the wireless communication structure 601, may be associated with a time slot 502 and/or correspond to a TTI 504 (e.g., 0.5 ms). A resource grid may be used to represent the time slot 502 including one or more time concurrent resource blocks (RBs) (also referred to as physical RBs (PRBs)). The resource grid is divided into multiple resource elements (REs). In aspects, an RB 506 includes 12 consecutive subcarriers (e.g., having 30 kHz subcarrier spacing) in the frequency domain and 14 consecutive symbols 510 in the time domain, for a total of 168 REs. In aspects, an RB contains 12 consecutive subcarriers in the frequency domain and 12 consecutive symbols in the time domain, for a total of 144 REs. Although the first mini-slot 602 and the second mini-slot 604 shown in FIG. 6 employ the same frequency resources, in aspects, the second mini-slot 604 may be associated with or employ different frequency resources than the frequency resources associated with or employed by the first mini-slot 602. Such different frequency resources associated with or employed by the second mini-slot 604 may be mutually exclusive of or partially overlap with the frequency resources associated with or employed by the first mini-slot 602. For example, frequency hopping, for retransmission (e.g., of the data) in second mini-slot 604 may provide some advantage (e.g., diversity). In aspects, a portion may be associated with a symbol, such that the wireless communication structure 601 is associated with a plurality of symbols which define a slot, and respective subsets of the plurality of symbols define a plurality of mini-slots. For example, the wireless communication structure 601 may be associated with a first mini-slot 602 and a second mini-slot 604. The time slot 502 may be associated with 14 consecutive symbols 510 in the time domain. The first mini-slot 602 may be associated with a first subset (e.g., the first seven symbols) of such 14 consecutive symbols and the second mini-slot 604 may be associated with a second subset (e.g., the last seven symbols) of such 14 consecutive symbols. Although the first mini-slot 602 and/or the second mini-slot 604 may include a larger or smaller number of symbols.

In aspects, for a NR D2D URLLC communication, the wireless communication structure 601 may be employed to communicate (e.g., transmit) data associated with NR D2D URLLC communication 609a using the first mini-slot 602 and re-communicate (e.g., re-transmit) the data using the second mini-slot 604. For such NR D2D URLLC communication a reliability is increased and/or latency is decreased (e.g., based on the repetition of data).

Wireless communication structure 601a illustrates first exemplary details of the first mini-slot 602 and the second mini-slot 604. For example, the time slot 502 may be associated with 14 consecutive symbols 510 in the time domain, the first mini-slot 602 may be associated with the first seven symbols, and the second mini-slot 604 may be associated with the last seven symbols.

The first mini-slot may include a request-to-send (RTS) portion 606, a first gap portion 608, a clear-to-send (CTS) portion 610, a second gap portion 612, a control portion 614, and a first data portion 616. For example, the RTS portion 606, first gap portion 608, CTS portion 610, second gap portion 612, control portion 614 and first data portion 616 may be associated with and/or correspond to a first symbol 618, second symbol 620, third symbol 622, fourth symbol 624, fifth symbol 626, and sixth through seventh symbols 628 of the time slot 502, respectively. During the RTS portion 618, one or more UEs 104, 104', 350, 450, 451, 452 in the NR D2D system 400 may monitor for a request-to-send signal from another UE 450 indicating such UE 104, 104', 350, 450, 451, 452 would like to transmit a NR D2D communication (e.g., NR D2D URLLC communication) during the slot 502. A UE 104, 104', 350, 450, 451, 452 that would like to transmit a communication during the slot 450 will transmit the RTS signal during the RTS portion. The first gap portion 620 may accommodate for uplink-downlink switching (e.g., turnaround) time for a UE 104, 104', 350, 450, 451, 452. In response, during the CTS portion 610, the one or more UEs 104, 104', 350, 450, 451, 452 receiving the RTS signal may transmit a CTS signal indicating the UE 450 that transmitted the RTS signal may transmit the D2D communication in the slot 502. Further, during the CTS portion 622, the UE 104, 104', 350, 450, 451, 452 that transmitted the RTS signal may monitor for such CTS signal(s) from the one or more other UEs 450. The second gap portion 624 may accommodate for uplink-downlink switching (e.g., turnaround) time of a UE 450. In this manner, a UE 104, 104', 350, 450, 451, 452 receiving the one or more CTS(s) may prepare to transmit the D2D communication in the slot 502. In aspects, as part of the D2D communication the UE 104, 104', 350, 450, 451, 452 may transmit control information, in part, indicating characteristics of one or more data sections of the D2D communication. For example, the control information may include an indication of amounts of data transmitted and/or a modulation and coding schemes associated with the one or more data sections, respectively. In aspects, the control information may be included in the control portion 614. The data portion 616 may include data associated with the D2D communication.

The second mini-slot 604 may include a second data portion 630, a third gap portion 632, and an acknowledgment (e.g., negative acknowledgement message (NAK)) portion 634. For example, the second data portion 630, the third gap portion 632, and the acknowledgment portion 634 may be associated with and/or correspond to an eighth through twelfth symbols 636, thirteenth symbol 638, and fourteenth symbol 640, respectively, of the time slot 502. The second data portion 630 may include data associated with the D2D communication re-transmitted. However, since a number of symbols associated with the second data portion 630 may be greater than the number of symbols associated with the first data portion 616, the retransmitted data of the D2D communication may have more redundant bits that the data of the D2D communication in the first data portion 616. The third gap portion 632 may accommodate for uplink-downlink switching (e.g., turnaround) time a UE 104, 104', 350, 450, 451, 452. In this manner, a UE 104, 104', 350, 450, 451, 452 (e.g., transmitting the data) may prepare to monitor for and possibly receive, in the acknowledgment portion 634, an acknowledgment message (e.g., NAK) associated with a previous transmission. If a UE 104, 104', 350, 450, 451, 452, receives a NAK for a previous NR D2D transmission, the UE 104, 104', 350, 450, 451, 452 may retransmit the NR D2D communication as described below with reference to FIG. 7.

In some aspects, the second mini-slot 604 may include a control portion 642 for control information associated with the data in the data portion 630 of the second mini-slot 604. The control portion 642 may include an indicator that the data portion 630 includes retransmitted data (e.g., a retransmitted version of the data transmitted in the first slot 602 for the NR D2D communication. In this manner, the indicator may be a re-transmission indicator. In such aspects, a size of the control portion 642 may be associated with one or more portions of a symbol 510 of the second mini-slot 604, and the second data portion 630, the third gap portion 632, and/or the acknowledgment portion 634 may be reduced accordingly in the time and/or frequency domain. In aspects, the second mini-slot 604 including the re-transmitted data may have such control portion 642, while the first mini-slot 602 including the data may not have such control portion 642. In aspects, the control portion 642 in the second mini-slot 604 may be smaller than control portion 614 in the first mini-slot 602. In aspects, data in the data portion 616 of the first mini-slot 602 may be independently decodable. Further, data in the data portion 630 of the second mini-slot 604 may be independently decodable.

While wireless communication structure 601a includes a control portion 614 in the first mini-slot 602, aspects of the present methods and apparatus may employ a wireless communication structure that does not include such control portion. For example, wireless communication structure 601b illustrates second exemplary details of the first mini-slot 602. Wireless communication structure 601b may be similar to wireless communication structure 601a. However, the wireless communication structure 601b may not include the control portion 614. Control information, in part, indicating characteristics of one or more data sections of the D2D communication 609b may be included in the RTS portion 606 (e.g., as part of an RTS signal). In such aspects, a size of the RTS portion 606, first gap portion 608, CTS portion 610, second gap portion 612, and/or the first data portion 616 may be adjusted accordingly in the time and/or frequency domain. For example, a size of the first data portion 616 may be increased in the time or frequency domain, which may facilitate using a more reliable modulation and coding scheme to communicate data in the first portion 616.

As described above, a wireless communication structure 601 for a NR D2D URLLC communication includes data associated with the D2D communication and also includes such data associated with the D2D communication re-transmitted in the wireless communication structure 601. Such a blind retransmission of the data may reduce or avoid delay and/or control overhead of communicating acknowledgement information for each such data transmission. Such blind retransmission may facilitate or serve as open loop HARQ procedures or functionality. In aspects, when performing such a back-to-back transmission-retransmission (e.g., of the data in the wireless communication structure 601), a same frequency resource may be employed for the data in the first mini-slot 602 and the re-transmitted data in the second mini-slot 604. Alternatively, in aspects frequency hopping, for retransmission (e.g., of the data) in second mini-slot 604 may provide some advantage (e.g., diversity). In aspects, a frequency relationship between the first mini-slot 602 and second mini-slot 604 may be fixed and/or configured.

The transmitted data (e.g., in the first mini-slot 602) and the re-transmitted data (e.g., in the second mini-slot 604) may be independently decoded by the receiving UE 450. Therefore, a latency may be reduced because the receiving UE 104, 104', 350, 450, 451, 452 may decode first transmission (e.g., the data in the first mini-slot 602 without having to wait for retransmission (e.g., the re-transmitted data in the second mini-slot 604). As shown, the second mini-slot 604 for the re-transmitted data does not include overhead such as the RTS portion 606, the first gap portion 608, the CTS portion 610, the second gap portion 612, and/or the control portion 614 of the first mini-slot 602. Consequently, more resources are available in the second mini-slot 604 for the re-transmitted data, which may allow use of a reduced code rate (e.g., for the re-transmitted data) to increase reliability.

As described above, the wireless communication structure 601 includes an acknowledgment portion 634 to account for feedback (e.g., a NAK). Such NAK is sent in the wireless communication structure 601 sent by a UE 104, 104', 350, 450, 451, 452 after a back-to-back transmission-retransmission of data of a previous wireless communication structure 601 was received (e.g., unsuccessfully) by the UE 104, 104', 350, 450, 451, 452. As described further with reference to FIG. 7, after receiving a NAK associated with a previous NR D2D URLLC transmission by a UE 104, 104', 350, 450, 451, 452, such UE 104, 104', 350, 450, 451, 452 may re-transmit the NR D2D URLLC (e.g., again perform back-to-back transmission-retransmission of the data from a previous wireless communication structure 601). Such feedback may facilitate closed loop HARQ procedures or functionality. In this manner the present methods and apparatus may effectively provide a design using open loop HARQ and closed loop HARQ.

Thus, a listen-before-talk (LBT) sequence may be employed, for example, before communicating data for NR D2D communication, such as a NR D2D normal communication, in a slot of a wireless communication structure 501. However, in aspects, RTS and CTS signaling along with a communication of data in a first mini-slot 602, and a communication of the data re-transmitted in a second mini-slot 604 of a wireless communication structure 601 may be employed for NR D2D communication, such as a NR D2D URLLC communication. In this manner, for such NR D2D URLLC communication a reliability is increased and/or latency is decreased (e.g., compared to TTI-based LBT communication mechanisms).

Figure 7:
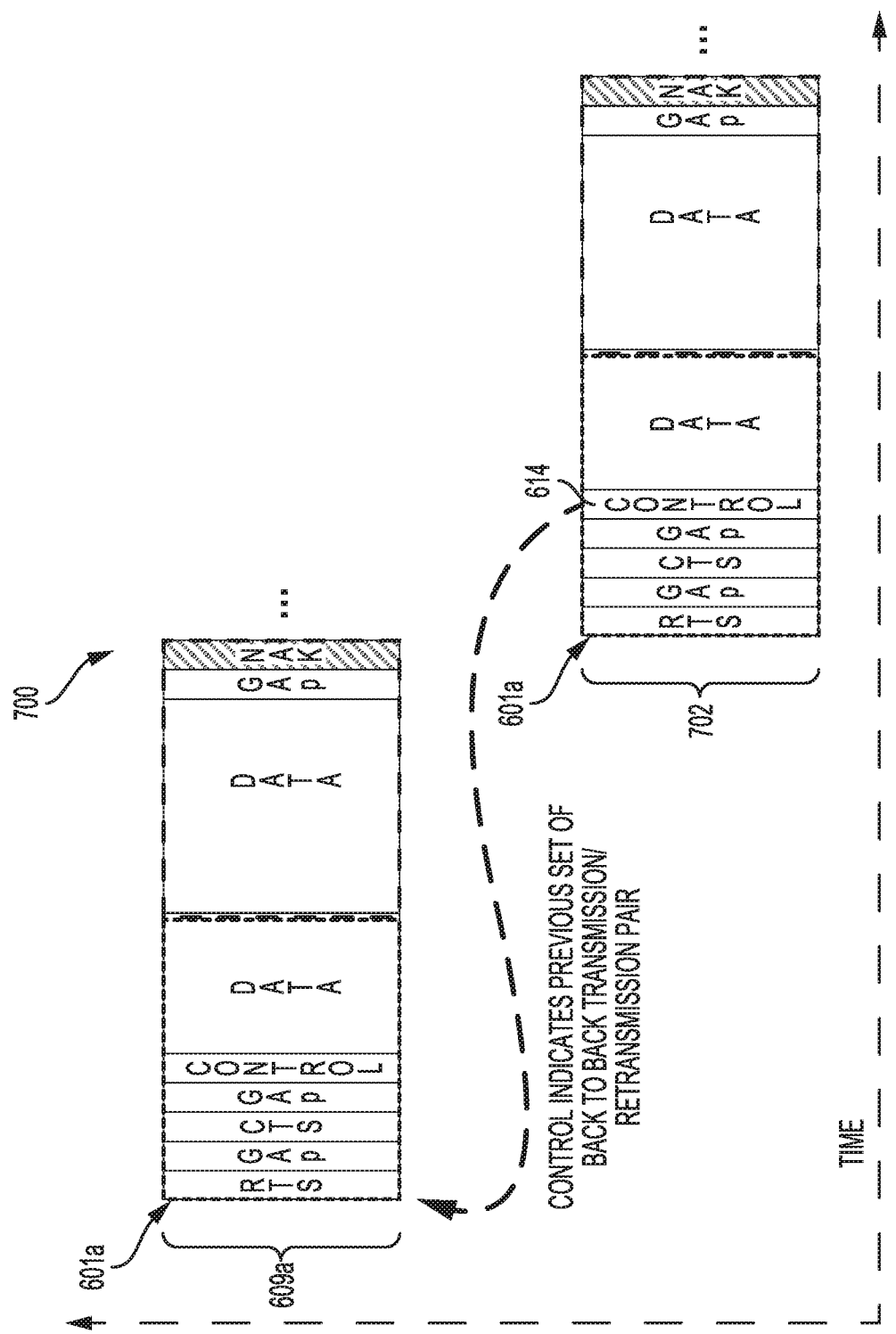
FIG. 7 is another diagram illustrating 5G NR D2D (e.g., V2V or V2X) ultra-reliable and low-latency communications (URLLC) communication in accordance with various aspects of the present disclosure.

FIG. 7 is another diagram illustrating 5G NR D2D (e.g., V2V or V2X) URLLC communication 700 in accordance with various aspects of the present disclosure. For example, a UE 104, 104', 350, 450, 451, 452 may communicate NR D2D URLLC communication 609, such as NR D2D URLLC communication 609a, using wireless communication structure 601a as described above. A HARQ process allows multiple transmissions (e.g., including an initial transmission and one or more retransmissions) to enable a receiving UE 104, 104', 350, 450, 451, 452 to decode a received packet of the transmissions. For example, the MAC layer may use HARQ to provide retransmission at the MAC layer to improve link efficiency. Accordingly, a HARQ process enables a certain data rate without perfect link adaptation. Should the UE 104, 104', 350, 450, 451, 452 receive a NAK associated with the previous NR D2D URLLC communication 609, in aspects, the UE 104, 104', 350, 450, 451, 452 may retransmit the NR D2D URLLC communication. For example, the re-transmission 702 of the NR D2D URLLC communication may include control information indicating the previous NR D2D URLLC communication 609a. In aspects, the control information indicating the previous NR D2D URLLC communication 609a may be included in the control portion 614. Similarly, if the UE 104, 104', 350, 450, 451, 452 communicates an NR D2D URLLC communication using wireless communication structure 601b for which a NAK is received, a re-transmission of the NR D2D URLLC communication may include control information indicating the previous NR D2D URLLC communication 609a in the RTS portion 606. Thus, a HARQ design for NR V2X URLLC may be provided. Data may be processed based on combining the retransmission of the communication and the previous communication. In this manner, if the data and re-transmitted data of a NR D2D URLLC communication 609 using wireless communication structure 601 is unsuccessfully communicated, the data and re-transmitted data may be included in a retransmission 702 of the NR D2D URLLC communication using wireless communication structure 601.

Figure 8:
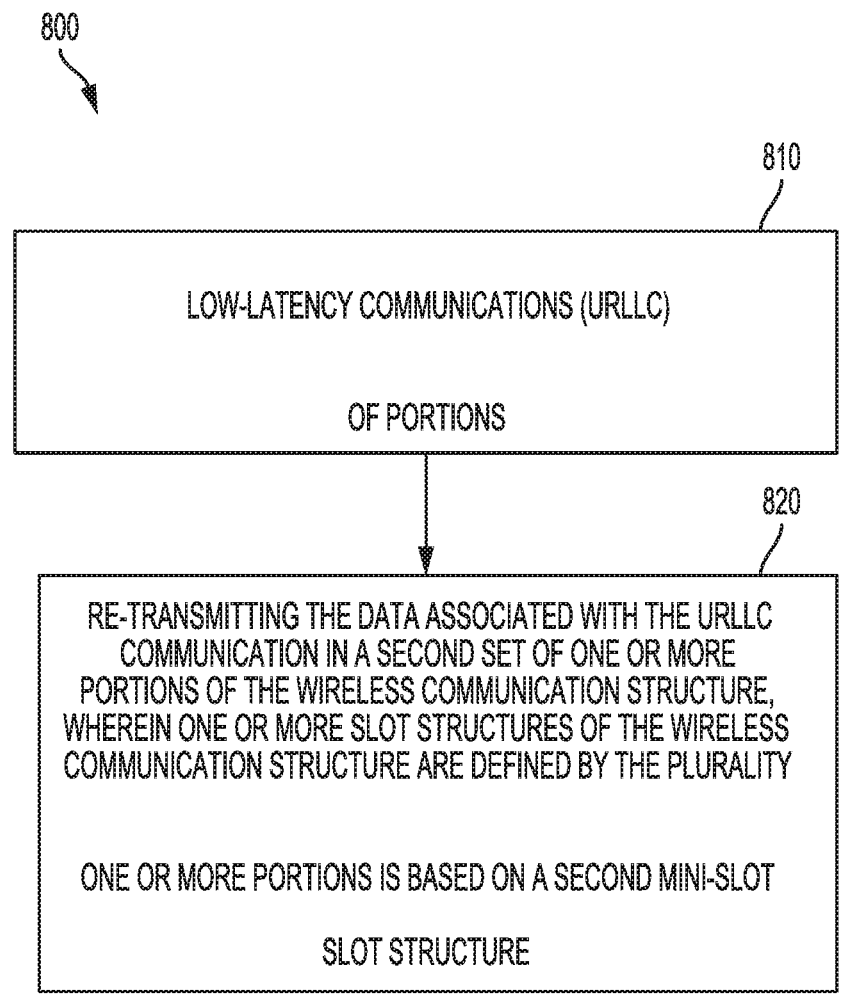
FIG. 8 is a flow diagram of a method of NR D2D URLLC communication in accordance with various aspects of the present disclosure.

FIG. 8 is a flow diagram of a method of NR D2D URLLC communication in accordance with various aspects of the present disclosure. Steps of the method 800 may be executed by a computing device (e.g., a processor, processing circuit, and/or other suitable component) of a wireless communication device, such as the UEs 104, 104', 350, 450 and 451. As illustrated, the method 800 of wireless communication includes a number of enumerated steps, but embodiments of the method 800 may include additional steps before, after, and in between the enumerated steps. In some embodiments, one or more of the enumerated steps may be omitted or performed in a different order.

At step 810, the method 800 includes transmitting data associated with an ultra-reliable and low-latency communications (URLLC) communication in a first set of one or more portions of a wireless communication structure having a plurality of portions. At step 820, the method 800 includes re-transmitting the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure. In aspects, the first mini-slot structure and the second mini-slot structure are associated with the same frequency resources. In aspects, the first mini-slot structure and the second mini-slot structure are associated with different frequency resources. For example, in aspects, the second mini-slot 604 may be associated with or employ different frequency resources than the frequency resources associated with or employed by the first mini-slot 602. In aspects, the method 800 may further comprise transmitting, in the first mini-slot structure, control information associated with at least one of the data in the first set or the data in the second set. In such aspects, the control information in the first mini-slot structure includes an indicator of a previous transmission, when the URLLC communication is a hybrid automatic repeat request retransmission. In such aspects, the method 800 may further comprise transmitting, in the second mini-slot structure, control information associated with the data in the second set. In such further aspects, the control information in the second mini-slot structure includes information indicating the data in the second set is the data re-transmitted.

In aspects, transmitting data associated the first set of one or more portions includes employing a first modulation and coding scheme providing a first redundancy, and re-transmitting the data in the second set of one or more portions includes employing a second modulation and coding scheme providing a second redundancy. In aspects, the second redundancy is greater than the first redundancy. In aspects, the method 800 may further comprise receiving, in the second mini-slot structure, an acknowledgement message associated with a transmission by the UE in at least one of a previous mini-slot structure, slot structure, or wireless communication structure. In aspects, the second mini-slot structure accounts for an acknowledgement message and the first mini-slot structure does not account for an acknowledgement message. In aspects, the mini-slot structure is aligned with a boundary of a portion. In aspects, the wireless communication structure includes one or more wireless communication subframes. In aspects, each portion of the plurality of portions is associated with a respective symbol. In aspects, the second set of one or more portions are subsequent the first set of one or more portions. In such aspects, the second set of one or more portions succeed the first set of one or more portions. In aspects, transmitting and re-transmitting include at least one of multi-casting, unicasting or broadcasting. In aspects, the method 800 may further comprise transmitting a non-URLLC communication in a slot structure of the wireless communication structure. In aspects, the method 800 may further comprise determining at least one of a mini-slot structure or a slot structure associated with the wireless communication structure based on a configuration, signaling or a combination thereof. In this manner, a reliability is increased and/or latency is decreased for a NR D2D communication, such as a NR D2D URLLC communication (e.g., compared to TTI-based LBT communication mechanisms).

Figure 9:
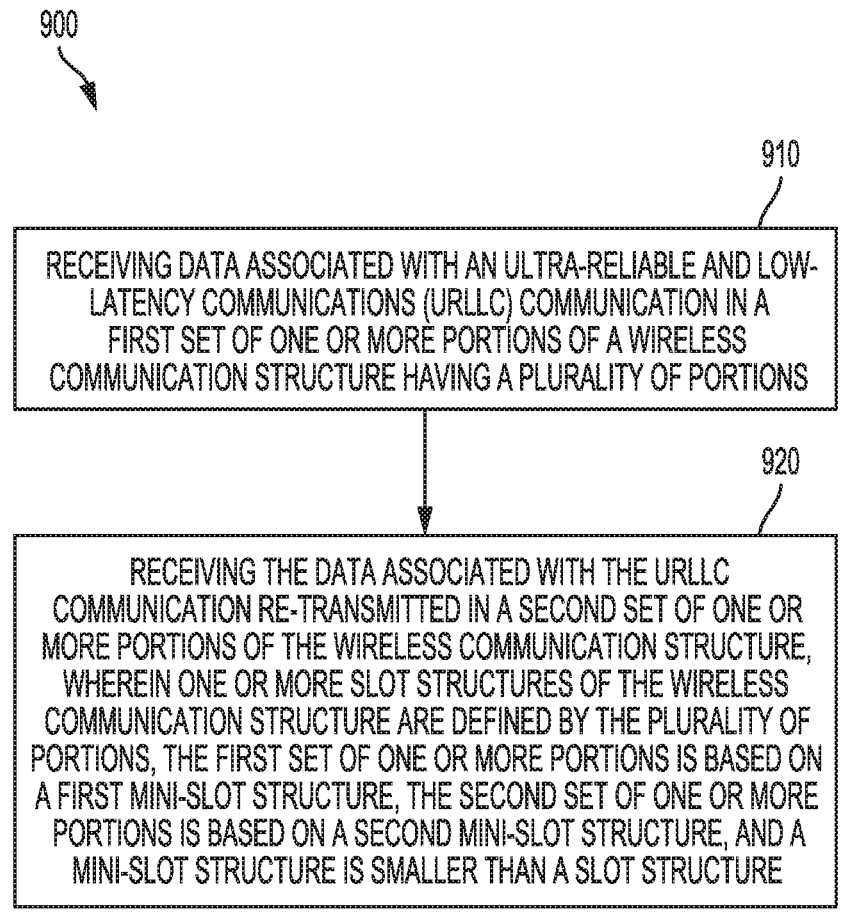
FIG. 9 is a flow diagram of another method of NR D2D URLLC communication in accordance with various aspects of the present disclosure.

FIG. 9 is a flow diagram of another method of NR D2D URLLC communication in accordance with various aspects of the present disclosure. Steps of the method 900 may be executed by a computing device (e.g., a processor, processing circuit, and/or other suitable component) of a wireless communication device, such as the UEs 104, 104', 350, 450 and 451. As illustrated, the method 900 of wireless communication includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving data associated with an ultra-reliable and low-latency communications (URLLC) communication in a first set of one or more portions of a wireless communication structure having a plurality of portions. At step 920, the method 900 includes receiving the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure. In aspects, the first mini-slot structure and the second mini-slot structure are associated with the same frequency resources. In aspects, the first mini-slot structure and the second mini-slot structure are associated with different frequency resources. For example, in aspects, the second mini-slot 604 may be associated with or employ different frequency resources than the frequency resources associated with or employed by the first mini-slot 602. In aspects, the method 900 may further comprise receiving, in the first mini-slot structure, control information associated with at least one of the data in the first set or the data in the second set. In such aspects, the control information in the first mini-slot structure includes an indicator of a previous URLLC communication, when the URLLC communication is a hybrid automatic repeat request retransmission. In such further aspects, the method 900 further comprises processing data based on combining the hybrid automatic repeat request retransmission and the previous URLLC communication.

In aspects, the method 900 may further comprise receiving, in the second mini-slot structure, control information associated with the data in the second set. In such aspects, the control information in the second mini-slot structure includes information indicating the data in the second set is the data re-transmitted. In aspects, receiving data associated the first set of one or more portions includes processing the data based on a first modulation and coding scheme providing a first redundancy, and receiving data re-transmitted in the second set of one or more portions includes processing the data based on a second modulation and coding scheme providing a second redundancy. In aspects, the method 900 may further comprise transmitting, in the second mini-slot structure, an acknowledgement message associated with a transmission by another network entity in at least one of a previous mini-slot structure, slot structure, or wireless communication structure. In aspects, the second mini-slot structure accounts for an acknowledgement message and the first mini-slot structure does not account for an acknowledgement message. In aspects, the mini-slot structure is aligned with a boundary of a portion. In aspects, the wireless communication structure includes one or more wireless communication subframes. In aspects, each portion of the plurality of portions is associated with a respective symbol. In aspects, the second set of one or more portions are subsequent the first set of one or more portions. In such aspects, the second set of one or more portions succeed the first set of one or more portions.

In aspects, the method 900 may further comprise decoding the data based on at least one of the first set of one or more portions or the second set of one or more portions. In aspects, the method 900 may further comprise receiving a non-URLLC communication in a slot structure of the wireless communication structure. In aspects, the method 900 may further comprise determining at least one of a mini-slot structure or a slot structure associated with the wireless communication structure based on a configuration, signaling or a combination thereof. In this manner, a reliability is increased and/or latency is decreased for a NR D2D communication, such as a NR D2D URLLC communication (e.g., compared to TTI-based LBT communication mechanisms).

Figure 10:
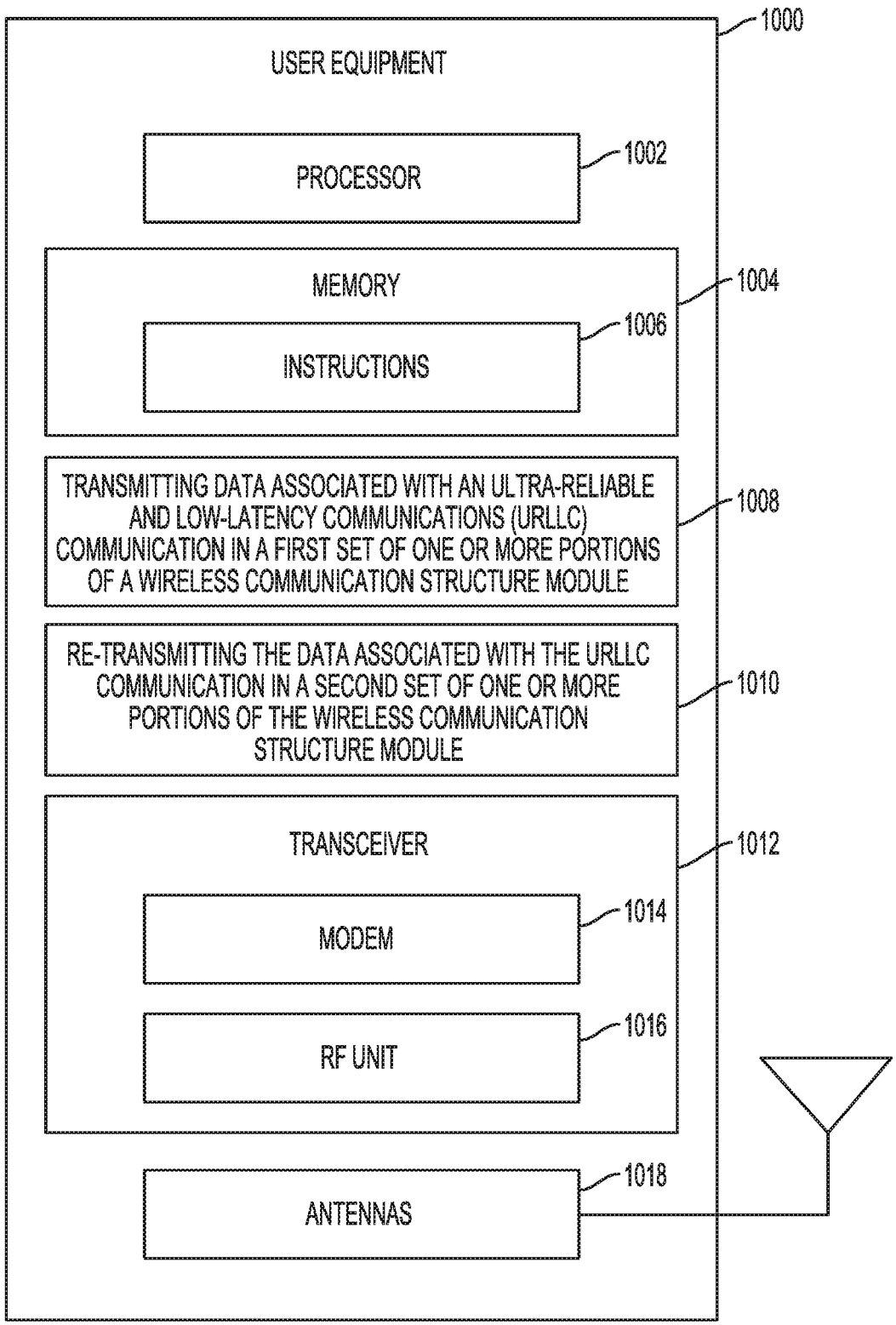
FIG. 10 is a block diagram of an exemplary user equipment (UE) in accordance with aspects of the present disclosure.

FIG. 10 is a block diagram of an exemplary user equipment (UE) in accordance with aspects of the present disclosure. In aspects, the UE 1000 may be a UE 104, 104', 350, 450, 451, 452, as discussed above, for example. As shown, the UE 1000 may include a processor 1002, a memory 1004, transmitting data associated with a URLLC communication in a first set of one or more portions of a wireless communication structure module 1008, a re-transmitting the data associated with the URLLC communication in a second set of one or more portions of the wireless communication structure module 1010, a transceiver 1012 including a modem subsystem 1014 and a radio frequency (RF) unit 1016, and one or more antennas 1018. These elements may be in direct or indirect communication with each other, for example via one or more buses.

The processor 1002 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1004 includes a non-transitory computer-readable medium. The memory 1004 may store instructions 1006. The instructions 1006 may include instructions that, when executed by the processor 1002, cause the processor 1002 to perform the operations, such as operations 800 and/or operations 900, described herein with reference to one or more of the UEs 104, 104', 350, 450 and 451 in connection with embodiments of the present disclosure. Instructions 1006 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The transmitting data associated with a URLLC communication in a first set of one or more portions of a wireless communication structure module 1008 and/or the re-transmitting the data associated with the URLLC communication in a second set of one or more portions of the wireless communication structure module 1010 may be used for various aspects of the present disclosure. For example, the transmitting data associated with a URLLC communication in a first set of one or more portions of a wireless communication structure module 1008 may transmit data associated with a URLLC communication in a first set of one or more portions of a wireless communication structure having a plurality of portions, and the re-transmitting the data associated with the URLLC communication in a second set of one or more portions of the wireless communication structure module 1010 may re-transmit the data associated with the URLLC communication in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

As shown, the transceiver 1012 may include the modem subsystem 1014 and the RF unit 1016. The transceiver 1012 may be configured to communicate bi-directionally with other devices, such as the BSs 102 or other UEs 104, 104', 350, 450, 451, 452. The modem subsystem 1014 may be configured to modulate and/or encode the data from the memory 1004, transmitting data associated with a URLLC communication in a first set of one or more portions of a wireless communication structure module 1008, and/or the re-transmitting the data associated with the URLLC communication in a second set of one or more portions of the wireless communication structure module 1010 according to a modulation and coding scheme (MCS), e.g., a low-density parity check (LDPC) coding scheme, a turbo coding scheme, a convolutional coding scheme, a digital beamforming scheme, etc. The RF unit 1016 may be configured to process (e.g., perform analog to digital conversion or digital to analog conversion, etc.) modulated/encoded data from the modem subsystem 1014 (on outbound transmissions) or of transmissions originating from another source such as another UE 104, 104', 350, 450, 451, 452 or a BS 102. The RF unit 1016 may be further configured to perform analog beamforming in conjunction with the digital beamforming. Although shown as integrated together in transceiver 1012, the modem subsystem 1014 and the RF unit 1016 may be separate devices that are coupled together at the UE 104, 104', 350, 450, 451, 452 to enable the UE 104, 104', 350, 450, 451, 452 to communicate with other devices.

The RF unit 1016 may provide the modulated and/or processed data, e.g. data packets (or, more generally, data messages that may contain one or more data packets and other information), to the antennas 1018 for transmission to one or more other devices. This may include, for example, transmission of non-URLLC communication (e.g., NR D2D normal communication) and/or URLLC communication (e.g., NR D2D URLLC communication), according to embodiments of the present disclosure. The antennas 1018 may further receive data messages transmitted from other devices. This may include, for example, receiving non-URLLC communication (e.g., NR D2D normal communication) and/or receiving URLLC communication (e.g., NR D2D URLLC communication), according to embodiments of the present disclosure. The antennas 1018 may provide the received data messages for processing and/or demodulation at the transceiver 1012. The antennas 1018 may include multiple antennas of similar or different designs in order to sustain multiple transmission links. The RF unit 1016 may configure the antennas 1018. In aspects, one or more of any of the components of the UE 104, 104', 350, 450, 451, 452 may perform NR D2D URLLC communication as described herein.

FIG. 10 is provided as an example. Other examples are possible and may differ from what was described in connection with FIG. 10.

Figure 11:
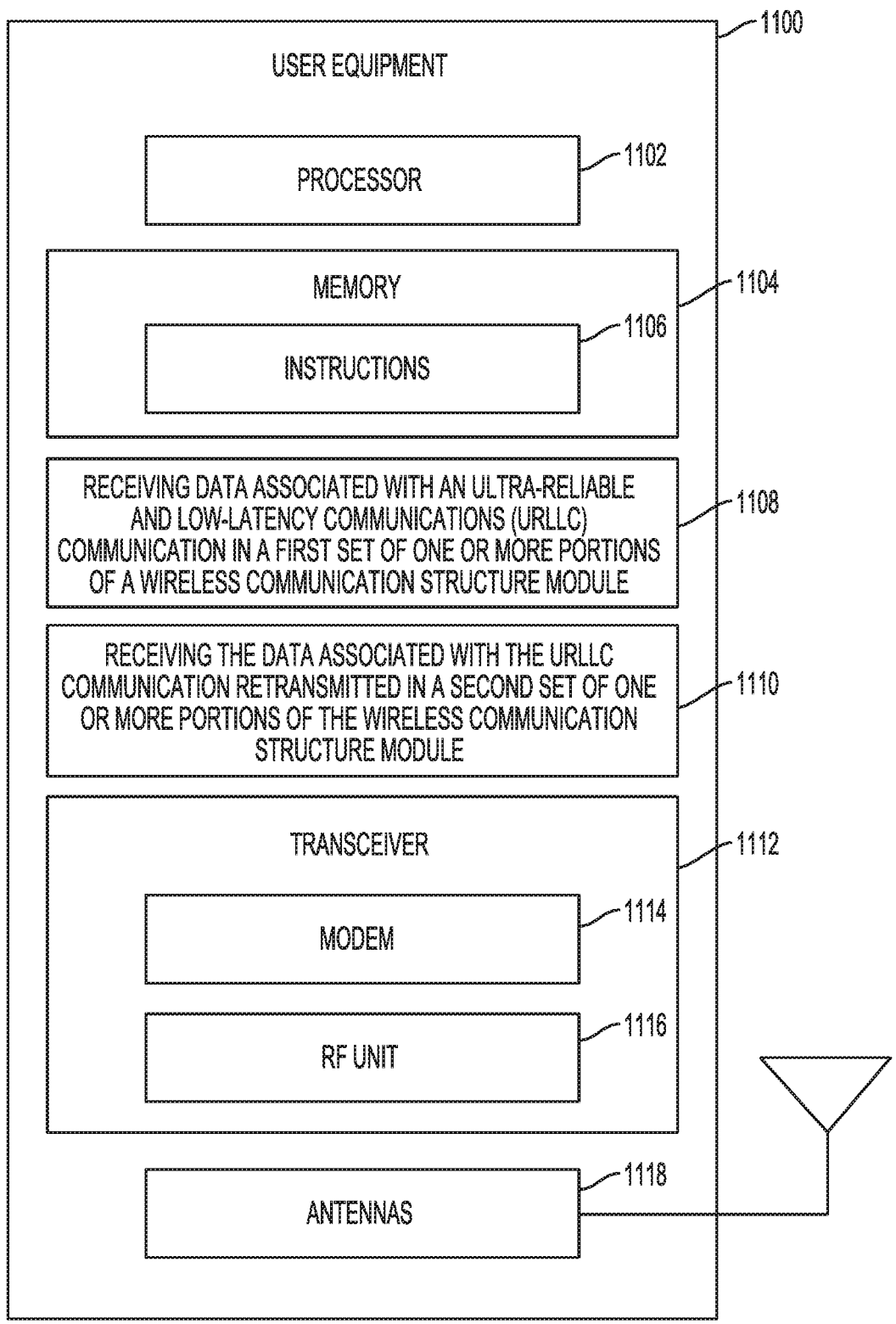
FIG. 11 is another block diagram of an exemplary user equipment (UE) in accordance with aspects of the present disclosure.

FIG. 11 is another block diagram of an exemplary user equipment (UE) in accordance with aspects of the present disclosure. In aspects, the UE 1100 may be a UE 104, 104', 350, 450, 451, 452, as discussed above, for example. As shown, the UE 1100 may include a processor 1102, a memory 1104, a receiving data associated with a URLLC communication in a first set of one or more portions of a wireless communication structure module 1108, a receiving the data associated with the URLLC communication re-transmitted in a second set of one or more portions of the wireless communication structure module 1110, a transceiver 1112 including a modem subsystem 1114 and a radio frequency (RF) unit 1116, and one or more antennas 1118. These elements may be in direct or indirect communication with each other, for example via one or more buses.

The processor 1102 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1104 includes a non-transitory computer-readable medium. The memory 1104 may store instructions 1106. The instructions 1106 may include instructions that, when executed by the processor 1102, cause the processor 1102 to perform the operations, such as operations 900 and/or operations 800, described herein with reference to one or more of the UEs 104, 104', 350, 450 and 451 in connection with embodiments of the present disclosure. Instructions 1106 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The receiving data associated with a URLLC communication in a first set of one or more portions of a wireless communication structure module 1108 and the receiving the data associated with the URLLC communication re-transmitted in a second set of one or more portions of the wireless communication structure module 1110 may be used for various aspects of the present disclosure. For example, the receiving data associated with a URLLC communication in a first set of one or more portions of a wireless communication structure module 1108 may receive data associated with a URLLC communication in a first set of one or more portions of a wireless communication structure having a plurality of portions, and the receiving the data associated with the URLLC communication re-transmitted in a second set of one or more portions of the wireless communication structure module 1110 may receive the data associated with the URLLC communication re-transmitted in a second set of one or more portions of the wireless communication structure, wherein one or more slot structures of the wireless communication structure are defined by the plurality of portions, the first set of one or more portions is based on a first mini-slot structure, the second set of one or more portions is based on a second mini-slot structure, and a mini-slot structure is smaller than a slot structure.

As shown, the transceiver 1112 may include the modem subsystem 1114 and the RF unit 1116. The transceiver 1112 may be configured to communicate bi-directionally with other devices, such as the BSs 102 or other UEs 104, 104', 350, 450, 451, 452. The modem subsystem 1114 may be configured to modulate and/or encode the data from the memory 1104, the receiving data associated with a URLLC communication in a first set of one or more portions of a wireless communication structure module 1108, and/or the communicating based on the adjusted wireless communication structure module 1110 according to a modulation and coding scheme (MCS), e.g., a low-density parity check (LDPC) coding scheme, a turbo coding scheme, a convolutional coding scheme, a digital beamforming scheme, etc. The RF unit 1116 may be configured to process (e.g., perform analog to digital conversion or digital to analog conversion, etc.) modulated/encoded data from the modem subsystem 1114 (on outbound transmissions) or of transmissions originating from another source such as another UE 104, 104', 350, 450, 451, 452 or a BS 102. The RF unit 1116 may be further configured to perform analog beamforming in conjunction with the digital beamforming. Although shown as integrated together in transceiver 1112, the modem subsystem 1114 and the RF unit 1116 may be separate devices that are coupled together at the UE 104, 104', 350, 450, 451, 452 to enable the UE 104, 104', 350, 450, 451, 452 to communicate with other devices.

The RF unit 1116 may provide the modulated and/or processed data, e.g. data packets (or, more generally, data messages that may contain one or more data packets and other information), to the antennas 1118 for transmission to one or more other devices. This may include, for example, transmission of non-URLLC communication (e.g., NR D2D normal communication) and/or URLLC communication (e.g., NR D2D URLLC communication), according to embodiments of the present disclosure. The antennas 1118 may further receive data messages and/or NR D2D URLLC communication transmitted from other devices. This may include, for example, receiving non-URLLC communication (e.g., NR D2D normal communication) and/or receiving URLLC communication (e.g., NR D2D URLLC communication), according to embodiments of the present disclosure. The antennas 1118 may provide the received data messages for processing and/or demodulation at the transceiver 1112. The antennas 1118 may include multiple antennas of similar or different designs in order to sustain multiple transmission links. The RF unit 1116 may configure the antennas 1118. In aspects, one or more of any of the components of the UE 104, 104', 350, 450, 451, 452 may perform NR D2D URLLC communication as described herein.

FIG. 11 is provided as an example. Other examples are possible and may differ from what was described in connection with FIG. 11.

It is understood that included herein are some example claim elements. For example, the wireless communication structure includes one or more wireless communication subframes; wherein the mini-slot structure is aligned with a boundary of a portion; wherein each portion of the plurality of portions is associated with a respective symbol. The second set of one or more portions succeed the first set of one or more portions. Transmitting and re-transmitting data include at least one of multi-casting, unicasting or broadcasting. Each portion of the plurality of portions is associated with a respective symbol.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   transmitting by the UE data associated with an ultra-reliable and low-latency communications (URLLC) communication in a vehicle-to-everything (V2X) environment in a first mini-slot structure of a slot structure; and
   re-transmitting by the UE the data associated with the URLLC communication in a second mini-slot structure of the slot structure blindly without waiting for a feedback from a receiver, wherein the first mini slot structure and the second min slot structure are contiguous within the slot structure.

2. The method of claim 1, wherein the first mini-slot structure and the second mini-slot structure are associated with the same frequency resources or different frequency resources.

3. The method of claim 1, further comprising transmitting, in the first mini-slot structure, control information associated with at least one of the data in a first set of one or more portions or the data in a second set of one or more portions.

4. The method of claim 3, wherein the control information in the first mini-slot structure includes an indicator of a retransmission, when the URLLC communication is a hybrid automatic repeat request (HARQ) retransmission.

5. The method of claim 3, further comprising transmitting, in the second mini-slot structure, control information associated with the data in the second set of one or more portions, wherein the control information includes information indicating the data in the second set of one or more portions is the data that is re-transmitted.

6. The method of claim 1, wherein:
transmitting the data by the UE in the first mini-slot structure includes employing a first modulation and coding scheme providing a first redundancy; and
re-transmitting the data by the UE in the second mini-slot structure includes employing a second modulation and coding scheme providing a second redundancy, wherein the second redundancy is greater in length than the first redundancy.

7. The method of claim 1, further comprising receiving, in the second mini-slot structure, an acknowledgement message associated with a transmission by the UE in at least one of a previous mini-slot structure, slot structure, or wireless communication structure, wherein the first mini-slot structure is not associated with an acknowledgement message.

8. The method of claim 1, wherein the second mini-slot structure is subsequent to the first mini-slot structure in either a frequency domain, a time domain or a combination thereof.

9. The method of claim 1, further comprising transmitting a non-URLLC communication in a slot structure of the wireless communication structure.

10. The method of claim 1, further comprising determining at least one of a mini-slot structure or a slot structure associated with the wireless communication structure based on a configuration, signaling or a combination thereof.

11. A method of wireless communication by a peer user equipment (UE), comprising:
receiving by the peer UE from a second UE data associated with an ultra-reliable and low-latency communications (URLLC) communication in a first mini-slot structure of a slot structure
receiving by the peer UE from the second UE the data associated with the URLLC communication re-transmitted in a second mini-slot structure, wherein the first mini-slot structure and the second min slot structure are contiguous within the slot structure; and
starting decoding the data in the first mini-slot structure without waiting till the end of the slot structure.

12. The method of claim 11, wherein the first mini-slot structure and the second mini-slot structure are associated with same frequency resources or different frequency resources.

13. The method of claim 11, further comprising receiving, in the first mini-slot structure, control information associated with at least one of the data in a first set of one or more portions or the data in a second set of one or more portions.

14. The method of claim 13, wherein the control information in the first mini-slot structure includes an indicator of a previous URLLC communication, when the URLLC communication is a hybrid automatic repeat request (HARQ) retransmission.

15. The method of claim 14, further comprising processing data based on combining the HARQ retransmission and the previous URLLC communication.

16. The method of claim 11, further comprising receiving, in the second mini-slot structure, control information associated with the data in a second set of one or more portions, wherein the control information in the second mini-slot structure includes information indicating the data in the second set of one or more portions is the data re-transmitted.

17. The method of claim 11, wherein:
receiving the data in the first mini-slot structure includes processing the data based on a first modulation and coding scheme providing a first redundancy; and
receiving the data re-transmitted in the second mini-slot structure includes processing the data based on a second modulation and coding scheme providing a second redundancy.

18. The method of claim 11, further comprising transmitting, in the second mini-slot structure, an acknowledgement message associated with a transmission by another network entity in at least one of a previous mini-slot structure, slot structure, or wireless communication structure; and wherein the first mini-slot structure is not associated with an acknowledgement message.

19. The method of claim 11, wherein the first mini-slot structure is aligned with a boundary of a portion and the second mini-slot structure is subsequent to the first mini-slot structure in either a frequency domain, a time domain or a combination thereof.

20. The method of claim 11, further comprising one or more of:
receiving by the peer UE from the second UE a non-URLLC communication in a slot structure of the wireless communication structure; and
determining by the peer UE from the second UE at least one of a mini-slot structure or a slot structure associated with the wireless communication structure based on a configuration, signaling or a combination thereof.

21. An apparatus for wireless communications implemented at a user equipment (UE), comprising
a transceiver;
a memory; and
at least one processor coupled to the memory and configured to
transmit by the UE data associated with an ultra-reliable and low-latency communications (URLLC) communication in a vehicle-to-everything (V2X) environment in a first mini-slot structure of a slot structure; and
re-transmit by the UE the data associated with the URLLC communication in a second mini-slot structure of the slot structure blindly without waiting for a feedback from a receiver, wherein the first mini-slot structure and the second min slot structure are contiguous within the slot structure.

22. The apparatus of claim 21, wherein the first mini-slot structure and the second mini-slot structure are associated with the same frequency resources or different frequency resources.

23. The apparatus of claim 21, wherein the at least one processor is further configured to transmit, in the first mini-slot structure, control information associated with at least one of the data in a first set of one or more portions or the data in a second set of one or more portions.

24. The apparatus of claim 23, wherein the control information in the first mini-slot structure includes an indicator of a previous transmission, when the URLLC communication is a hybrid automatic repeat request retransmission.

25. The apparatus of claim 23, wherein the at least one processor is further configured to transmit, in the second mini-slot structure, control information associated with the data in the second set of one or more portions, wherein the control information in the second mini-slot structure includes information indicating the data in the second set is the data re-transmitted.

26. The apparatus of claim 21, wherein:
to transmit by the UE the data in the first mini-slot includes employing a first modulation and coding scheme providing a first redundancy; and
to re-transmit by the UE the data in the second mini-slot structure includes employing a second modulation and coding scheme providing a second redundancy, wherein the second redundancy is greater in length than the first redundancy.

27. The apparatus of claim 21, wherein the at least one processor is further configured to receive, in the second mini-slot structure, an acknowledgement message associated with a transmission by the UE in at least one of a previous mini-slot structure, slot structure, or wireless communication structure, wherein the first mini-slot structure is not associated with an acknowledgement message.

28. The apparatus of claim 21, wherein the second mini-slot structure is subsequent to the first mini-slot structure.

29. The apparatus of claim 21, wherein the at least one processor is further configured to transmit a non-URLLC communication in a slot structure of the wireless communication structure.

30. An apparatus for wireless communications implemented at a peer user equipment (UE), comprising
a transceiver;
a memory; and
at least one processor coupled to the memory and configured to
receive by the peer UE from a second UE data associated with an ultra-reliable and low-latency communications (URLLC) communication in a first mini-slot structure of a slot structure;
receive by the peer UE from the second UE the data associated with the URLLC communication re-transmitted in a second mini-slot structure, wherein the first mini-slot structure and the second mini-slot structure are contiguous within the slot structure; and
start decoding the data in the first mini-slot structure without waiting till the end of the slot structure.

* * * * *